(12) United States Patent
Kim et al.

(10) Patent No.: US 7,550,038 B2
(45) Date of Patent: *Jun. 23, 2009

(54) POLY CROSS-LINKED PHTHALOCYANINE COMPOUND AND NEAR-INFRARED ABSORBING INK COMPOSITION COMPRISING THE SAME

(75) Inventors: Shi-surk Kim, Ashan Si (KR); Hwal-jong Lee, Osan-si (KR); Kyung-mi Lee, Incheon (KR)

(73) Assignee: CMS Technology Inc., Choongnam (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/994,079

(22) PCT Filed: Jun. 8, 2006

(86) PCT No.: PCT/KR2006/002190

§ 371 (c)(1),
(2), (4) Date: Dec. 27, 2007

(87) PCT Pub. No.: WO2007/013732

PCT Pub. Date: Feb. 1, 2007

(65) Prior Publication Data

US 2008/0184909 A1    Aug. 7, 2008

(30) Foreign Application Priority Data

Jul. 25, 2005    (KR) .................... 10-2005-0067396

(51) Int. Cl.
*C09D 11/02* (2006.01)
*C08G 73/00* (2006.01)
*C07D 487/22* (2006.01)
*C09B 47/04* (2006.01)
*C09B 62/00* (2006.01)

(52) U.S. Cl. ................. 106/31.49; 106/31.78; 528/422; 540/139; 540/140

(58) Field of Classification Search ............. 106/31.49, 106/31.78; 528/422; 540/122, 139, 140
See application file for complete search history.

(56) References Cited

U.S. PATENT DOCUMENTS

| 4,223,123 A | 9/1980 | Keller et al. ................ 528/210 |
| 4,311,775 A * | 1/1982 | Regan ........................ 430/37 |
| 4,943,681 A * | 7/1990 | Sato et al. .................. 540/140 |
| 5,456,998 A * | 10/1995 | Burt et al. .................. 430/58.8 |
| 5,675,001 A * | 10/1997 | Hoffman et al. ............ 540/139 |
| 7,163,772 B2 * | 1/2007 | Yamasaki et al. .......... 540/139 |
| 2004/0146793 A1 * | 7/2004 | Yamasaki et al. .......... 430/59.4 |

FOREIGN PATENT DOCUMENTS

| JP | 7 295259 | 11/1995 |
| JP | 2004 212725 | 7/2004 |
| KR | 1999 0085367 | 12/1999 |

* cited by examiner

*Primary Examiner*—Helene Klemanski
(74) *Attorney, Agent, or Firm*—Oblon, Spivak, McClelland, Maier & Neustadt, P.C.

(57) ABSTRACT

Disclosed herein is a novel crosslinked polyphthalocyanine compound. The polyphthalocyanine compound has a structure in which phthalocyanine units are crosslinked to absorb wavelengths in the near-infrared range of 750 to 900 nm, thus being suitable for use as a near-infrared absorber. Further disclosed is a near-infrared absorbing ink composition comprising the polyphthalocyanine compound as a near-infrared absorber.

20 Claims, 4 Drawing Sheets

[Fig. 1]
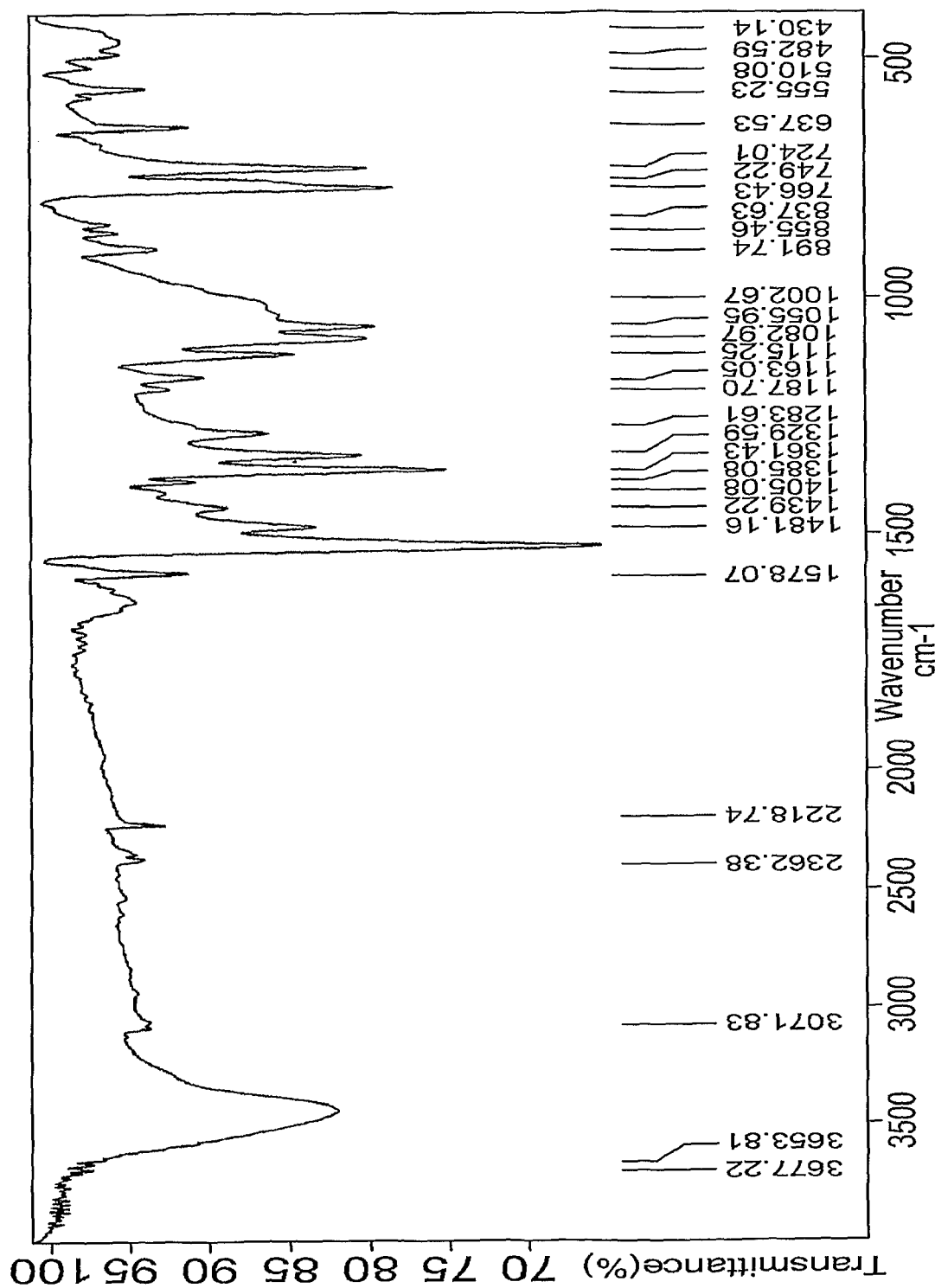

[Fig. 2]
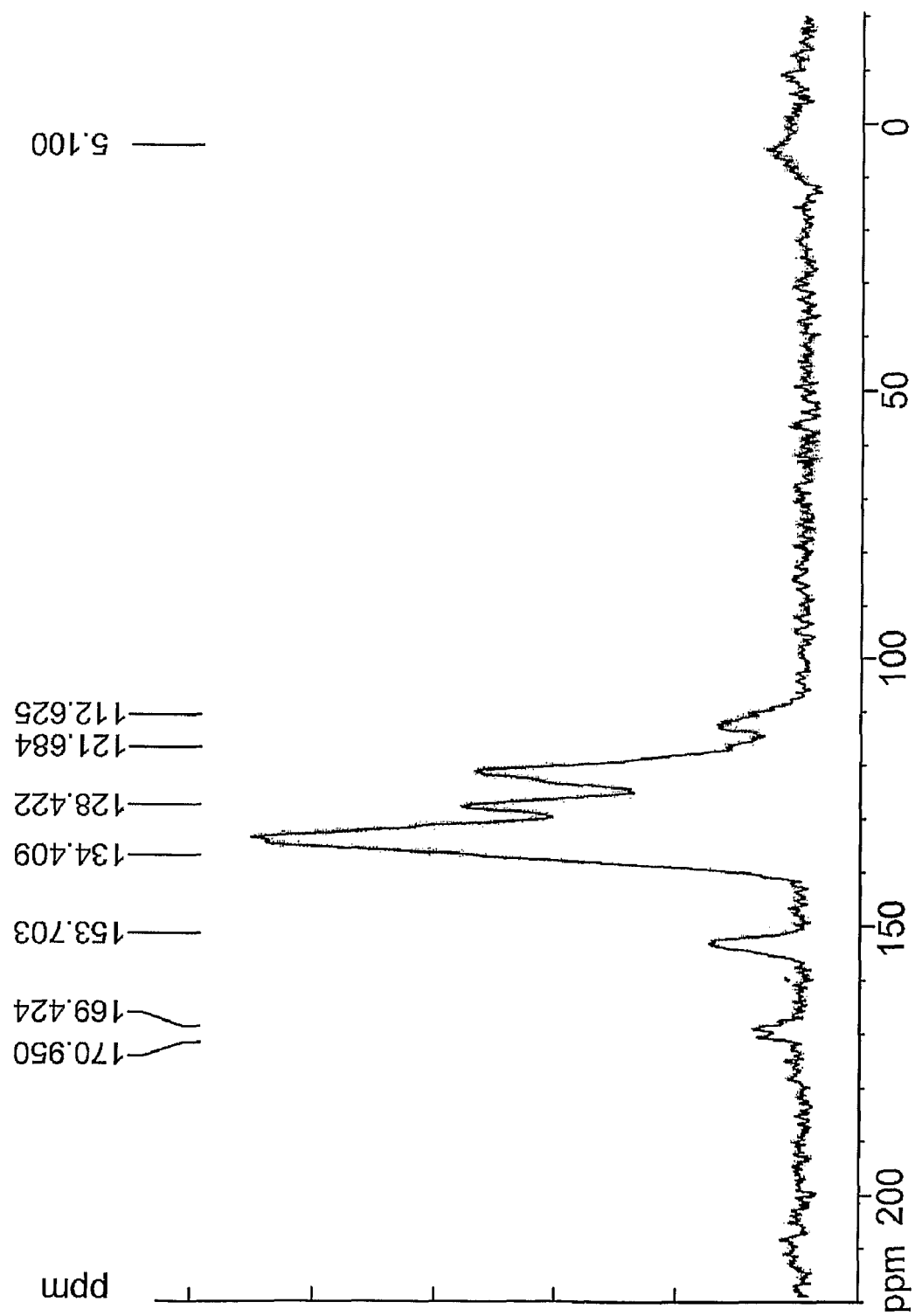

[Fig. 3]
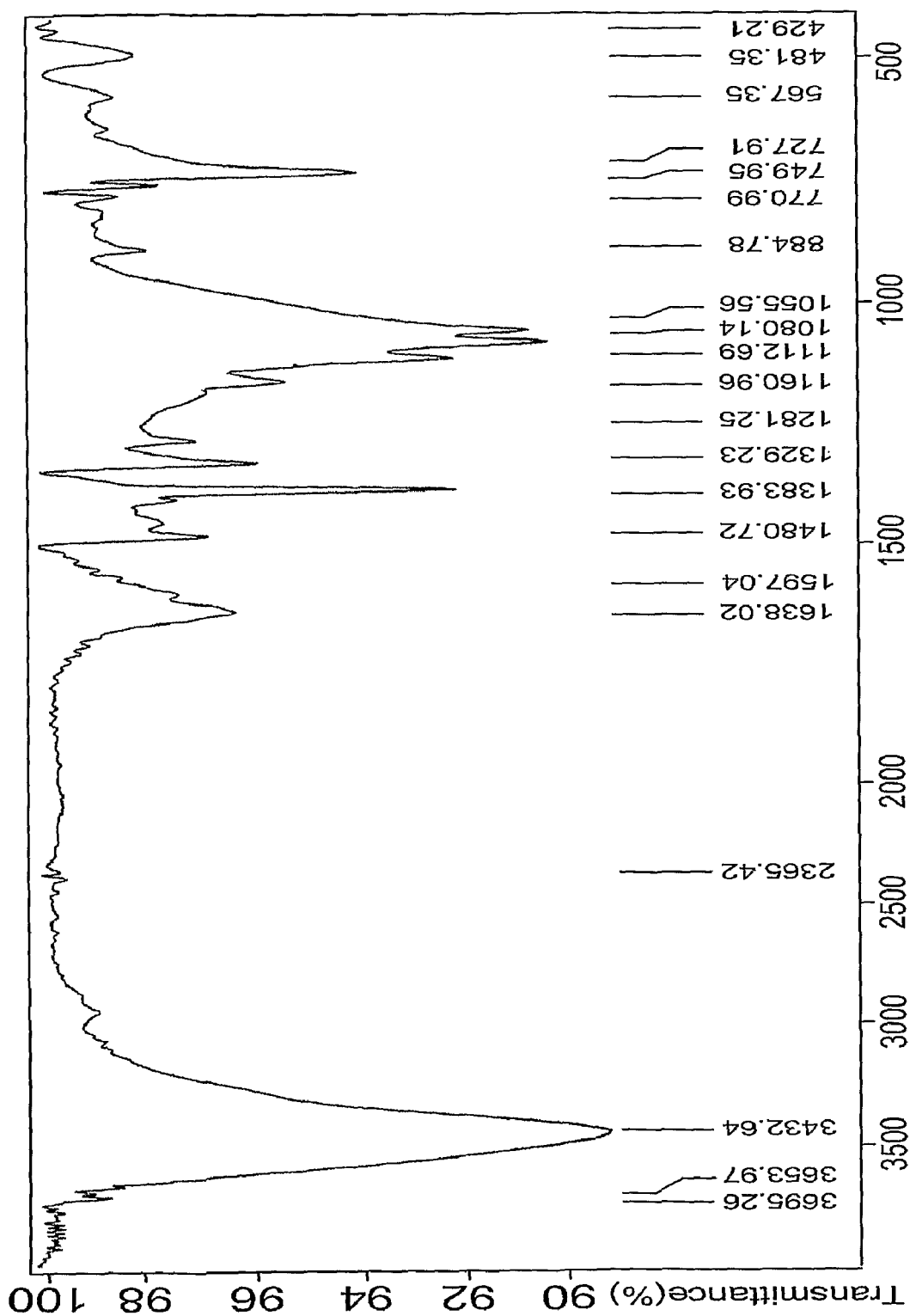

[Fig. 4]
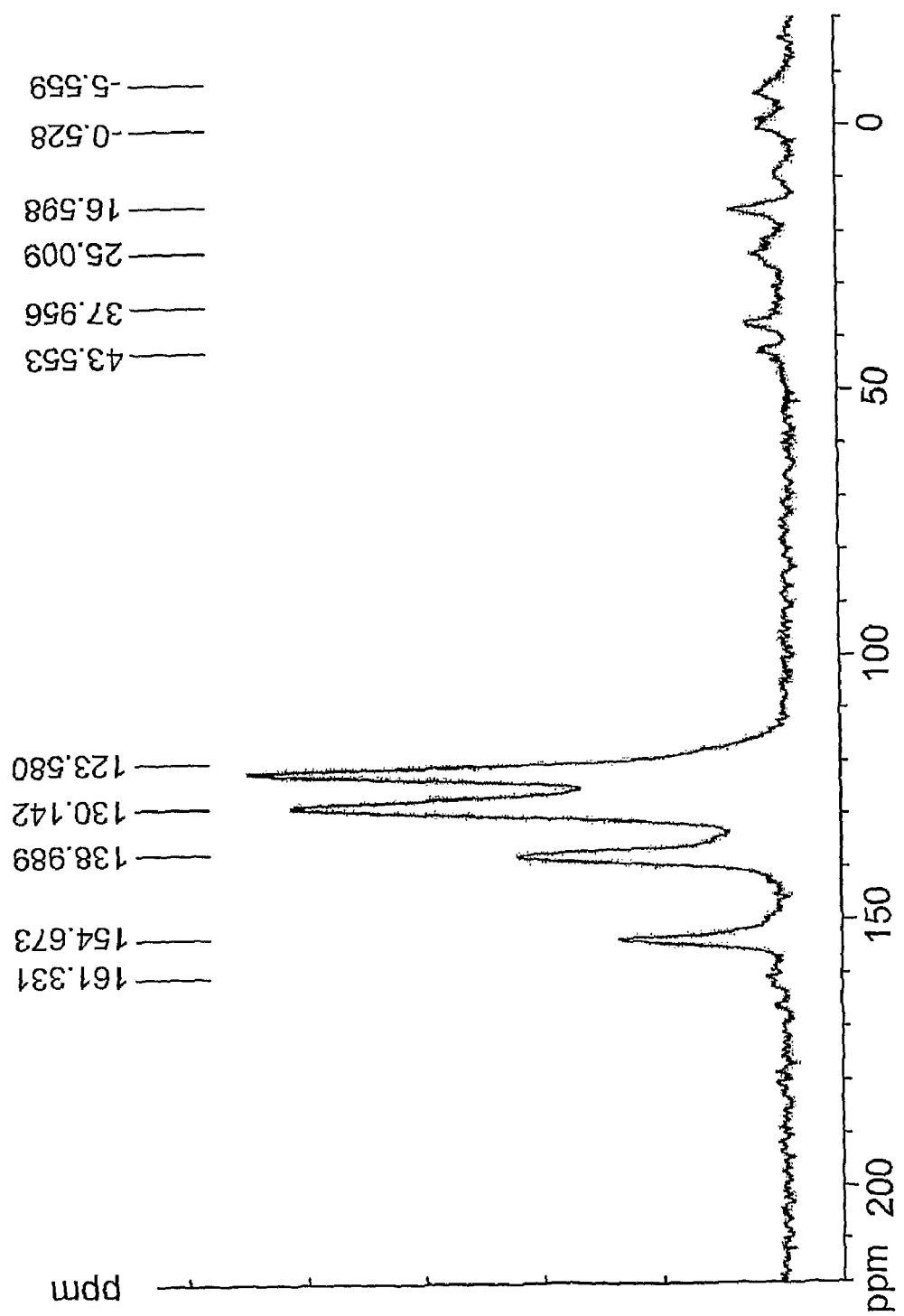

POLY CROSS-LINKED PHTHALOCYANINE COMPOUND AND NEAR-INFRARED ABSORBING INK COMPOSITION COMPRISING THE SAME

BACKGROUND OF THE INVENTION

1. Field of the Invention

The present invention relates to a crosslinked polyphthalocyanine compound and a near-infrared absorbing ink composition comprising the phthalocyanine compound. More particularly, the present invention relates to a novel compound having a structure in which phthalocyanine units are crosslinked to absorb wavelengths in the near-infrared range of 750 to 900 nm, thus being suitable for use as a near-infrared absorber, and a near-infrared absorbing ink composition comprising the crosslinked polyphthalocyanine compound as a near-infrared absorber.

2. Description of the Related Art

In general, phthalocyanine compounds have a high transmittance in the visible region, block near-infrared light with high efficiency, have a strong ability to selectively absorb wavelengths in the near-infrared region, and are highly resistant to heat, light and weather. Based on these advantages, phthalocyanine compounds are now widely used in a variety of applications, including inks.

Various techniques associated with phthalocyanine compounds have been disclosed. For example, Korean Patent Laid-open No. 2003-96052 discloses a phthalocyanine compound represented by the following Formula 1 and a production process thereof:

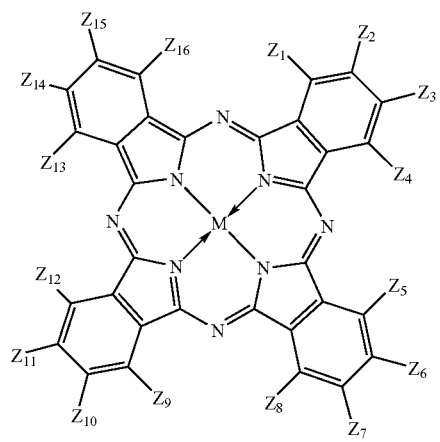

(1)

wherein $Z_2$, $Z_3$, $Z_6$, $Z_7$, $Z_{10}$, $Z_{11}$, $Z_{14}$ and $Z_{15}$ each independently represent $SR_1$, $SR_2$, $OR_3$ or a halogen atom, with the proviso that at least one of $Z_2$, $Z_3$, $Z_6$, $Z_7$, $Z_{10}$, $Z_{11}$, $Z_{14}$ and $Z_{15}$ is $SR_2$; $Z_1$, $Z_4$, $Z_5$, $Z_8$, $Z_9$, $Z_{12}$, $Z_{13}$ and $Z_{16}$ each independently represent $NHR_4$, $NHR_5$, $SR_1$, $SR_2$, $OR_3$ or a halogen atom, with the proviso that at least one of $Z_1$, $Z_4$, $Z_5$, $Z_8$, $Z_9$, $Z_{12}$, $Z_{13}$ and $Z_{16}$ is $NHR_5$ and at least four of $Z_1$, $Z_4$, $Z_5$, $Z_8$, $Z_9$, $Z_{12}$, $Z_{13}$ and $Z_{16}$ is $OR_3$; $R_1$ represents a phenyl group which is optionally substituted, an alkyl group, or a $C_1$-$C_{20}$ alkyl group which is optionally substituted; $R_2$ represents a phenyl group which is optionally substituted with a $C_1$-$C_{20}$ alkoxy group; $R_3$ and $R_4$ each independently represent a phenyl group which is optionally substituted, an alkyl group, or a $C_1$-$C_{20}$ alkyl group which is optionally substituted; $R_5$ represents a $C_1$-$C_{20}$ alkyl group which is optionally substituted, $R_1$, $R_2$, $R_3$, $R_4$ and $R_5$ being the same or different from each other; M represents a nonmetal, a metal, a metal oxide, or a metal halide.

The phthalocyanine compound can be readily prepared by bonding a phthalic anhydride, a phthalimide, 1,2-dicyanobenzene, 1,2-dicyanoisoindoline and others to urea and a metal, followed by reaction at a high temperature while blocking oxygen from entering during the reaction or using a high-boiling point solvent.

The phthalocyanine compound of Formula 1 exists in a single molecular form. In contrast, Korean Patent Laid-open No. 2005-20832 discloses an oxo crosslinked dissimilar metal phthalocyanine compound represented by the following Formula 2:

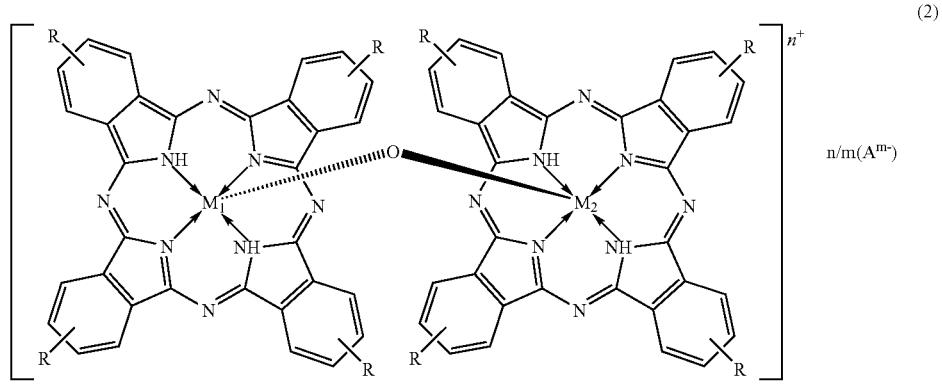

(2)

$n/m(A^{m-})$ wherein $M_1$ represents a metal atom which is able to have a valence of up to three, except indium; $M_2$ represents a metal atom which is able to have a valence of four; R represents each independently one or more substituent groups and/or substituent atoms; $(A^{m-})$ represents a counteranion A having a valence of m; n/m represents the number of the counteranion; n represents an integer selected from 0 or 1 to 3 corresponding to a valence of $M_2$; and m represents 1 or 2.

However, the phthalocyanine compound of Formula 1 as well as the dimeric phthalocyanine compound of Formula 2 have the problems of low absorptivity in the near-infrared region and poor resistance to chemicals and solvents.

SUMMARY OF THE INVENTION

Thus, it is one object of the present invention to provide a novel crosslinked polyphthalocyanine compound that has a high absorptivity in the near-infrared wavelength region and is thus suitable for use as a near-infrared absorber.

It is another object of the present invention to provide an ink comprising the crosslinked polyphthalocyanine compound as a near-infrared absorber.

In accordance with one aspect of the present invention for achieving the above objects, there is provided a crosslinked polyphthalocyanine compound represented by Formula 3 below:

wherein $M_1$ and $M_2$, which may be the same or different from each other, are independently selected from nonmetals, metals, metal oxides, and metal halides; $R_1$ to $R_{16}$, which may be the same or different from each other, are independently selected from a hydrogen atom, a halogen atom, a hydroxyl group, an amino group, a hydroxysulfonyl group, an aminosulfonyl group, alkyl groups, substituted $C_1$-$C_{20}$ alkyl groups, $SR_{17}$ (in which $R_{17}$ is a substituted phenyl group, an alkyl group, or a $C_1$-$C_{20}$ alkyl group), $SR_{18}$ (in which $R_{18}$ is a phenyl group substituted with a $C_1$-$C_{20}$ alkoxy group), $OR_{19}$ (in which $R_{19}$ is a substituted phenyl group, an arylalkyl group, or a $C_1$-$C_{20}$ alkyl group), $NHR_{20}$ (in which $R_{20}$ is a substituted phenyl group, an arylalkyl group, or a $C_1$-$C_{20}$ alkyl group), and $NHR_{21}$ (in which $R_{21}$ is a substituted $C_1$-$C_{20}$ alkyl group); and n is an integer from 1 to 20.

In accordance with another aspect of the present invention, there is provided a near-infrared absorbing ink composition comprising the compound of Formula 3 as a near-infrared absorber.

BRIEF DESCRIPTION OF THE DRAWINGS

The above and other objects, features and other advantages of the present invention will be more clearly understood from the following detailed description taken in conjunction with the accompanying drawings, in which:

(3)

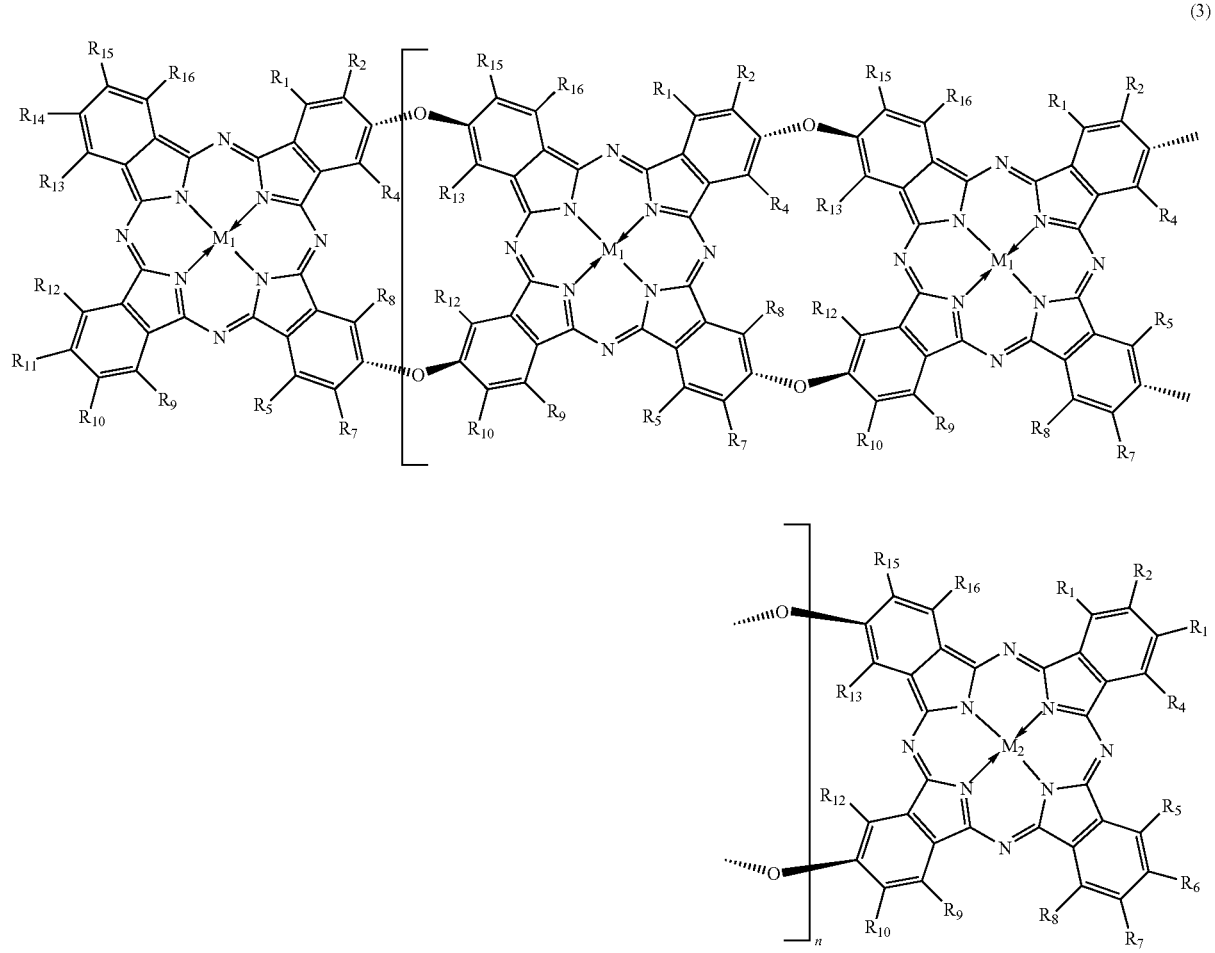

FIG. 1 is an infrared (IR) absorption spectrum of a compound prepared in Example 1;

FIG. 2 is a $^{13}$C-NMR spectrum of a compound prepared in Example 1;

FIG. 3 is an infrared absorption spectrum of a magnesium phthalocyanine compound of Comparative Example 1; and FIG. 4 is a $^{13}$C-NMR spectrum of a magnesium phthalocyanine compound of Comparative Example 1.

DESCRIPTION OF THE PREFERRED EMBODIMENTS

The present invention will now be described in greater detail.

Since the novel crosslinked polyphthalocyanine compound of Formula 3 according to the present invention has a high absorptivity in the near-infrared wavelength region and is highly resistant to light, heat and weather, it is suitable for use as a near-infrared absorber. Particularly, the absorption wavelengths of the crosslinked polyphthalocyanine compound according to the present invention are shifted toward the near-infrared region when compared to those of conventional phthalocyanine compounds in a single molecular form. Accordingly, the crosslinked polyphthalocyanine compound of the present invention strongly absorbs wavelengths in the near-infrared region.

This shift can be readily demonstrated from the analytical results for the absorption wavelengths of the crosslinked polyphthalocyanine compound of the present invention and conventional phthalocyanine compounds by spectrophotometry. General commercially available phthalocyanine compounds have an absorption in the visible wavelength region (~670 nm), whereas the crosslinked polyphthalocyanine compound of the present invention has an absorption in the near-infrared wavelength region. Although some commercially available phthalocyanine compounds have been found to have an absorbance around the near-infrared region, they have a low absorptivity at the absorption wavelength. In contrast, the crosslinked polyphthalocyanine compound of the present invention has a maximum absorbance at a wavelength of 750 to 900 nm.

Among crosslinked polyphthalocyanine compounds that can be represented by Formula 3, preferred is a crosslinked polyphthalocyanine compound wherein one of $R_1$ to $R_4$ is R, one of $R_5$ to $R_8$ is R, one of $R_9$ to $R_{12}$ is R, one of $R_{13}$ to $R_{16}$ is R and the others are hydrogen, which is represented by Formula 4 below:

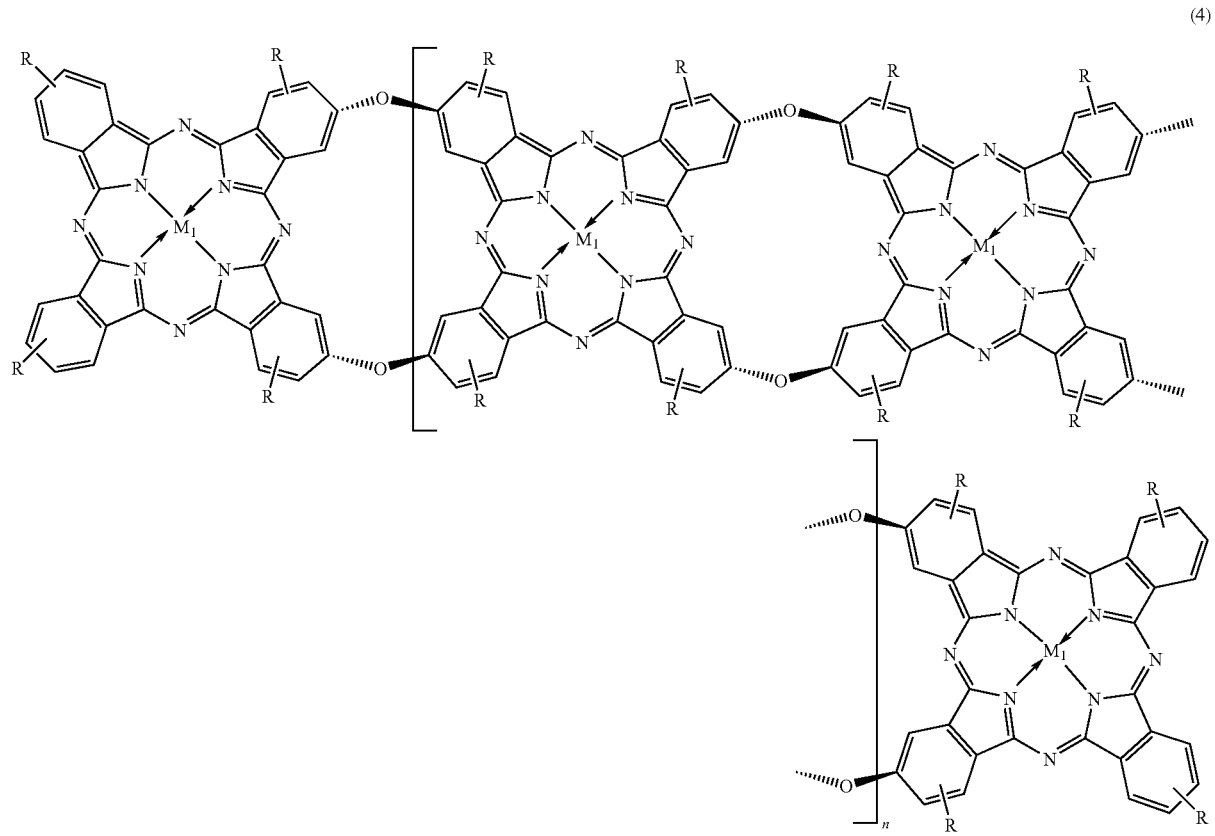

(4)

wherein $M_1$ and $M_2$, which may be the same or different from each other, are independently selected from nonmetals, metals, metal oxides, and metal halides; each R is hydrogen or a $C_4$-$C_8$ alkyl group; and n is an integer from 2 to 4.

Examples of suitable metals for use as $M_1$ and $M_2$ include lithium, beryllium, boron, sodium, magnesium, aluminum, silicon, phosphor, potassium, calcium, scandium, titanium, vanadium, chromium, manganese, iron, cobalt, nickel, copper, zinc, gallium, germanium, arsenic, yttrium, zirconium, niobium, molybdenum, technetium, ruthenium, rhodium, palladium, silver, cadmium, indium, tin, antimony, barium, lanthanum, cerium, praseodymium, samarium, europium, gadolinium, terbium, dysprosium, holmium, erbium, thulium, ytterbium, ruthenium, hafnium, tantalum, tungsten, rhenium, osmium, iridium, platinum, gold, mercury, thallium, lead, bismuth, actinium, thorium, protactinium, uranium, neptunium, and americium. Examples of suitable metal oxides for use as $M_1$ and $M_2$ include titanyl, vanadyl, and molybdenum oxides. Examples of suitable metal halides for use as $M_1$ and $M_2$ include magnesium chloride, aluminum chloride, gallium chloride, gallium chloride, indium chloride, neodymium chloride, ruthenium chloride, germanium chloride, rhodium (III) chloride, hafnium chloride, manganese (III) chloride, zinc chloride, tin (II) chloride, tin (IV) chloride, silicon chloride, and zinc iodide.

Preferred are a crosslinked polyphthalocyanine compound wherein each $M_1$ and $M_2$ is manganese in Formula 4, which is represented by Formula 5 below:

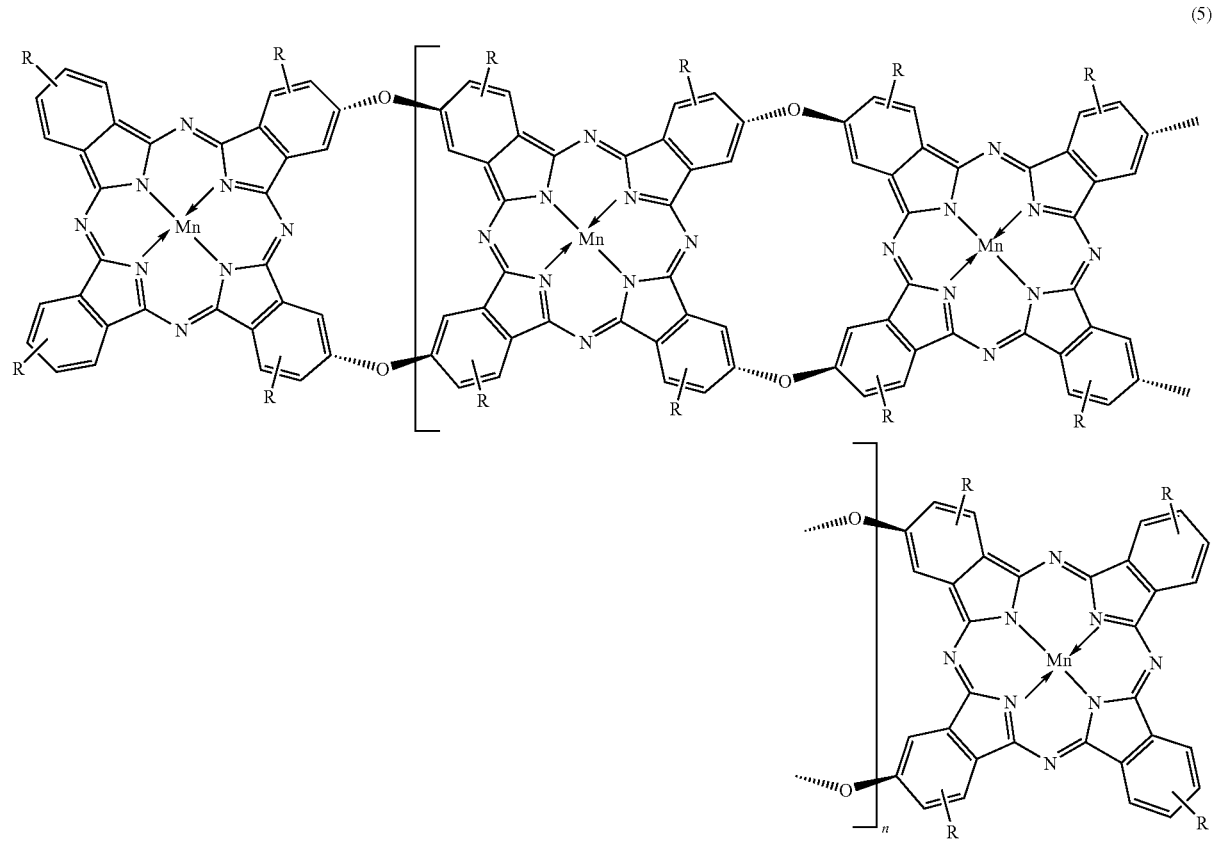

(5)

wherein each R is a $C_4$-$C_8$ alkyl group and n is an integer from 2 to 4; and a crosslinked polyphthalocyanine compound wherein each $M_1$ and $M_2$ is vanadyl in Formula 4, which is represented by Formula 6 below:

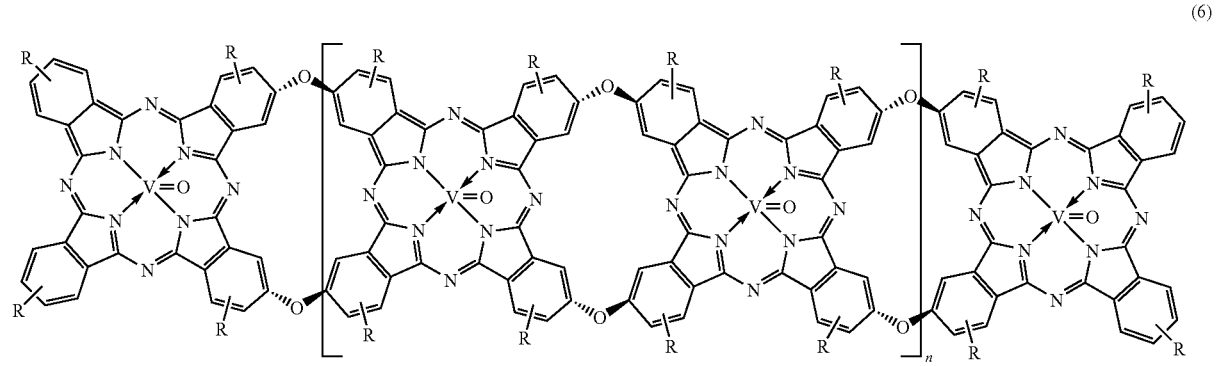

(6)

wherein each R is a $C_4$-$C_8$ alkyl group and n is an integer from 2 to 4.

Preferred is a crosslinked dissimilar metal polyphthalocyanine compound wherein $M_1$ and $M_2$ are different from each other in Formula 4.

More preferred is a crosslinked dissimilar metal polyphthalocyanine compound wherein $M_1$ is magnesium and $M_2$ is sodium in Formula 4, which is represented by Formula 7 below:

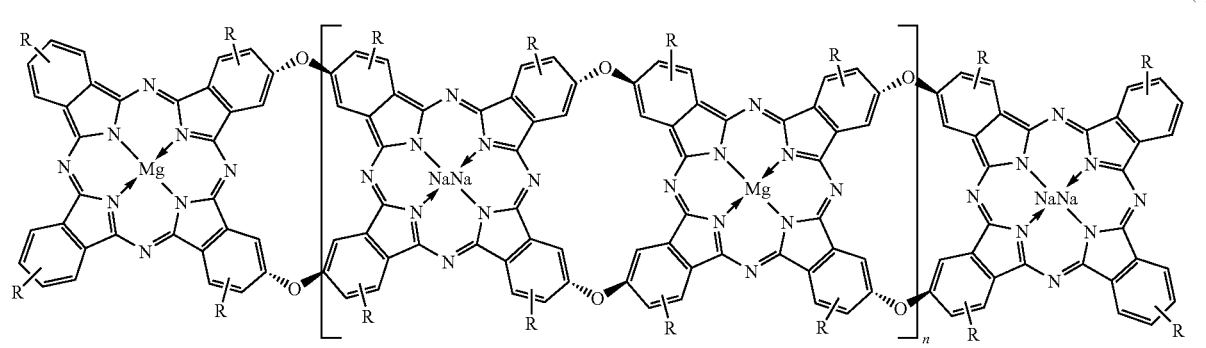

(7)

wherein each R is a $C_4$-$C_8$ alkyl group and n is an integer from 2 to 4.

More preferred is a crosslinked dissimilar metal polyphthalocyanine compound wherein $M_1$ is lithium and $M_2$ is sodium in Formula 4, which is represented by Formula 8 below:

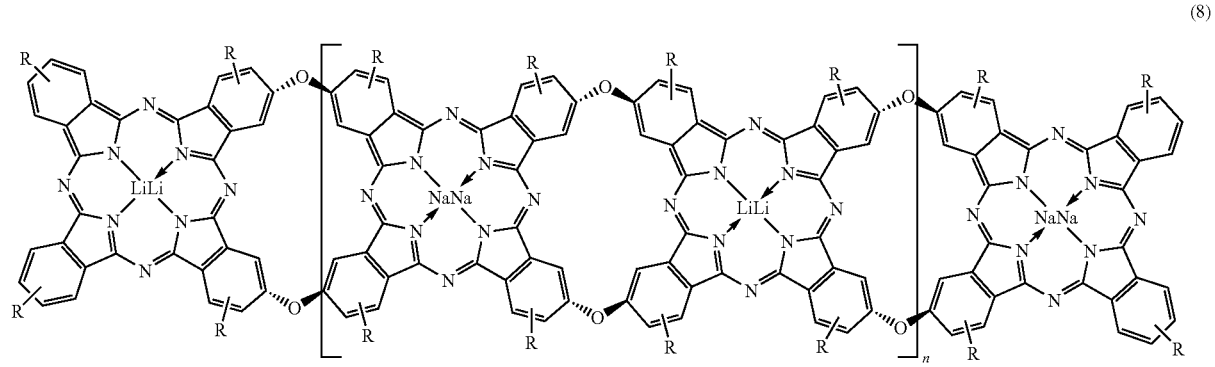

(8)

wherein each R is a $C_4$-$C_8$ alkyl group and n is an integer from 2 to 4.

More preferred is a crosslinked dissimilar metal polyphthalocyanine compound wherein $M_1$ is potassium and $M_2$ is silver in Formula 4, which is represented by Formula 9 below:

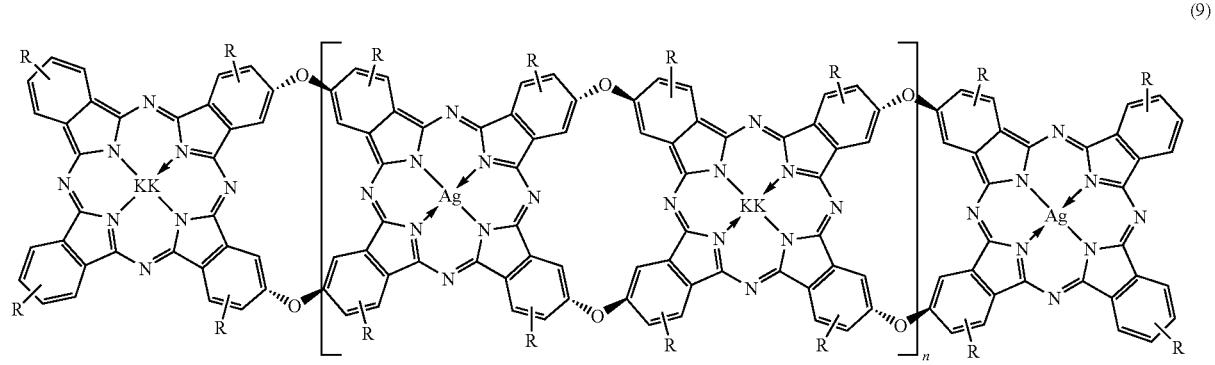

(9)

wherein each R is a $C_4$-$C_8$ alkyl group and n is an integer from 2 to 4.

Preferred is a crosslinked polyphthalocyanine compound wherein each R is hydrogen in Formula 4, which is represented by Formula 10 below:

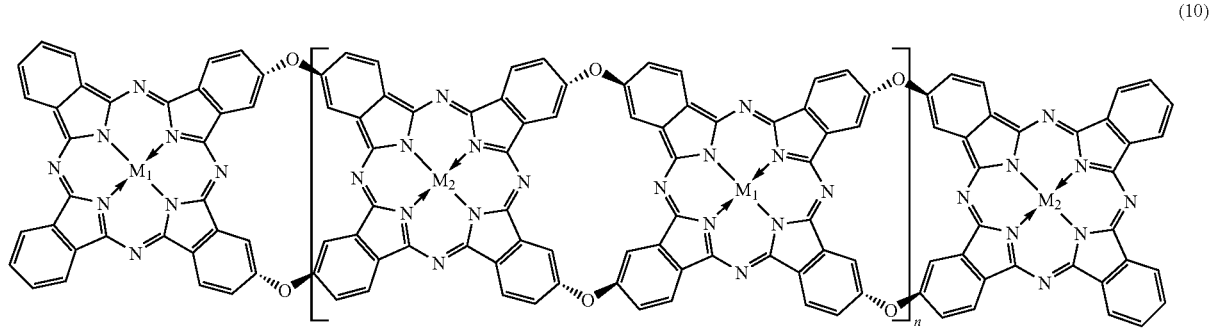

(10)

wherein $M_1$ and $M_2$, which may be the same or different from each other, are independently selected from nonmetals, metals, metal oxides, and metal halides; and n is an integer from 2 to 4.

Preferred are a crosslinked polyphthalocyanine compound wherein each $M_1$ and $M_2$ is manganese in Formula 10, which is represented by Formula 11 below:

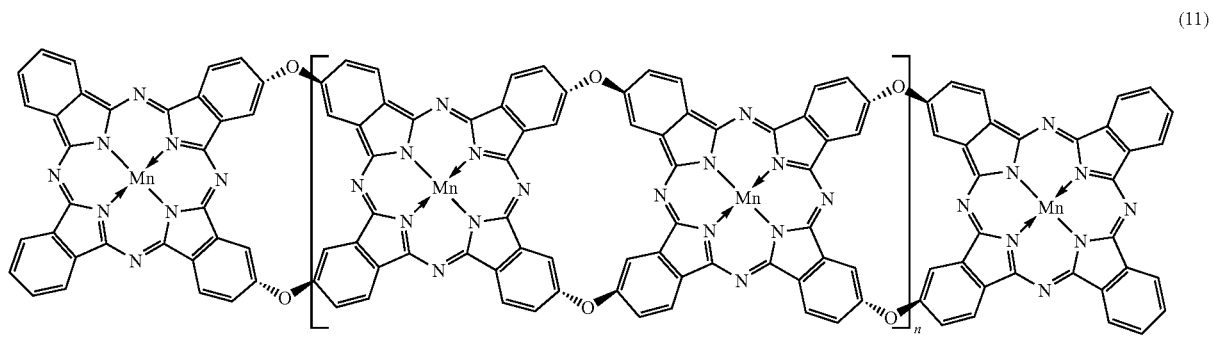

(11)

wherein n is an integer from 2 to 4; and
a crosslinked polyphthalocyanine compound wherein each $M_1$ and $M_2$ is vanadyl in Formula 10, which is represented by Formula 12 below:

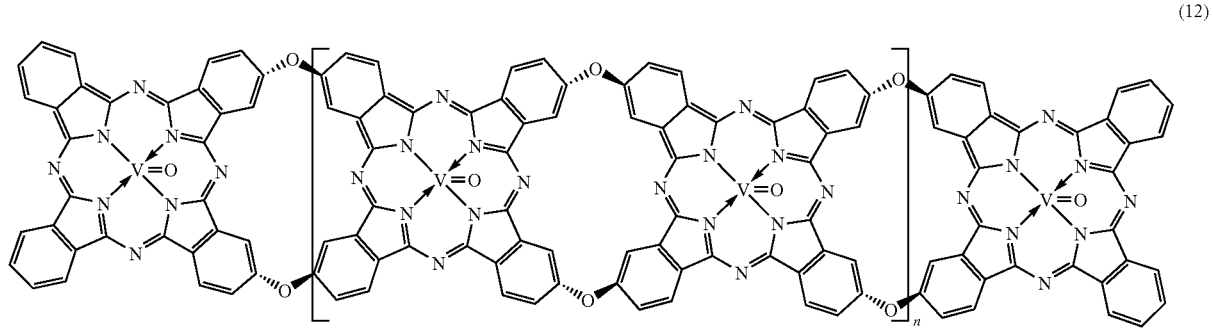

(12)

wherein n is an integer from 2 to 4.

Preferred is a crosslinked dissimilar metal polyphthalocyanine compound wherein $M_1$ and $M_2$ are different from each other in Formula 10.

Particularly preferred is a crosslinked dissimilar metal polyphthalocyanine compound wherein $M_1$ is magnesium and $M_2$ is sodium in Formula 10, which is represented by Formula 13 below:

The crosslinked polyphthalocyanine compound of Formula 3 according to the present invention can be readily prepared by the following procedure. First, a phthalic anhydride, urea, a salt or chloride of metals corresponding to $M_1$ and $M_2$, a high-boiling point solvent and a reaction initiator are mixed at room temperature. The mixture is allowed to react at reflux (230-250° C.) for 6-8 hours, filtered while maintaining the temperature at 70-100° C., and sequentially (13)

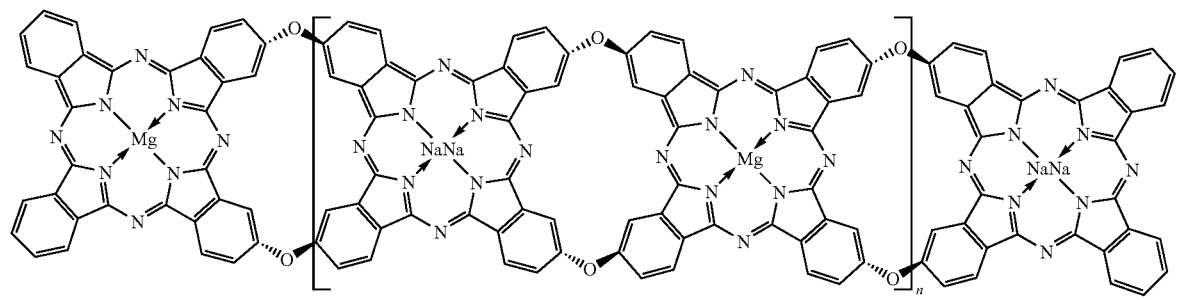

wherein n is an integer from 2 to 4.

Preferred is a crosslinked dissimilar metal polyphthalocyanine compound wherein $M_1$ is lithium and $M_2$ is sodium in Formula 10, which is represented by Formula 14 below:

washed with a dilute acid solution and an alkaline solution at 65-70° C. to obtain a cake free from unreacted raw materials. The cake is dispersed in an aqueous ethylene glycol (5 wt %) solution until the concentration of the dispersion reaches 5-10

(14)

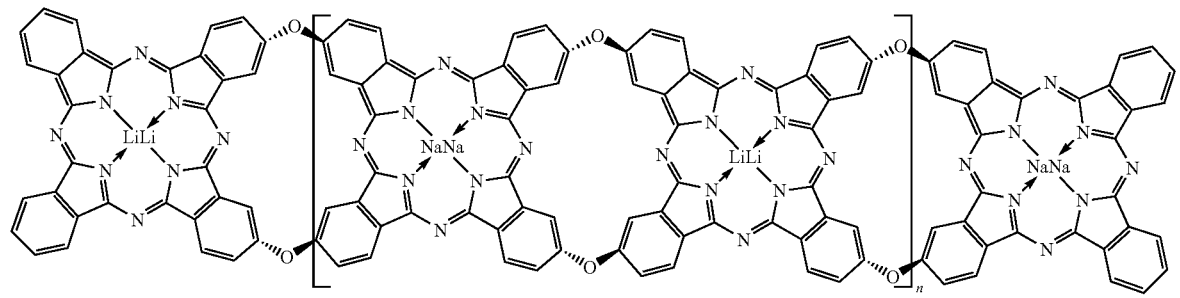

wherein n is an integer from 2 to 4.

Preferred is a crosslinked dissimilar metal polyphthalocyanine compound wherein $M_1$ is potassium and $M_2$ is silver in Formula 10, which is represented by Formula 15 below:

wt %. The dispersion is heat-treated for 2 hours while maintaining the temperature at 80-120° C., followed by filtration. The filtrate is sequentially dispersed in acetone and dimethy- (15)

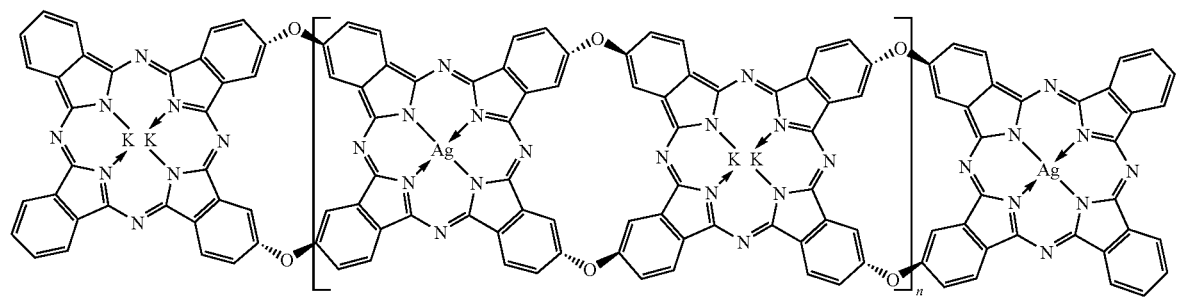

wherein n is an integer from 2 to 4.

lacetamide, purified in a Soxhlet apparatus at 45-175° C., and dried to give the desired crosslinked polyphthalocyanine compound.

The phthalic anhydride herein used is represented by the following Formula 16:

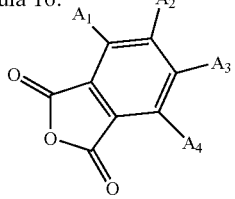

wherein $A_1$ to $A_4$, which may be the same or different from each other, are independently selected from a hydrogen atom, a halogen atom, a hydroxyl group, an amino group, a hydroxysulfonyl group, an aminosulfonyl group, alkyl groups, substituted $C_1$-$C_{20}$ alkyl groups, $SR_{17}$ (in which $R_{17}$ is a substituted phenyl group, an alkyl group, or a $C_1$-$C_{20}$ alkyl group), $SR_{18}$ (in which $R_{18}$ is a phenyl group substituted with a $C_1$-$C_{20}$ alkoxy group), $OR_{19}$ (in which $R_{19}$ is a substituted phenyl group, an arylalkyl group, or a $C_1$-$C_{20}$ alkyl group), $NHR_{20}$ (in which $R_{20}$ is a substituted phenyl group, an arylalkyl group, or a $C_1$-$C_{20}$ alkyl group), and $NHR_{21}$ (in which $R_{21}$ is a substituted $C_1$-$C_{20}$ alkyl group).

If the phthalic anhydride of Formula 16 is mixed with moisture, its reaction force drops. Accordingly, care must be taken to prevent moisture from being introduced into the phthalic anhydride during storage and to maintain the phthalic anhydride in a dry form until use. A general urea product can be used as the urea. As a reaction solvent, there can be used a low-polarity, high-boiling point solvent, for example, α-methylnaphthalene, α-chloronaphthalene, dichlorobenzene, DMF, n-alkylbenzene or ethylene glycol.

The crosslinked polyphthalocyanine compound thus prepared has a crosslinked structure different from that of already known phthalocyanine compounds. Since the crosslinked polyphthalocyanine compound has a strong ability to absorb wavelengths in the near-infrared range of 750 to 900 nm, it is suitable for use as a near-infrared absorber.

The present invention also provides an ink comprising the crosslinked polyphthalocyanine compound of Formula 3 as a near-infrared absorber. Particularly, the crosslinked polyphthalocyanine compound of the present invention has excellent light, heat, weather and chemical resistance, is highly miscible with other ink components, and has poor abrasion and wear resistance. Accordingly, when the crosslinked polyphthalocyanine compound is included as a near-infrared absorber for an ink, it allows the ink to show the advantageous characteristics. Although the crosslinked polyphthalocyanine compound of the present invention is used in a smaller amount than conventional inorganic infrared absorbers, the desired effects can be sufficiently obtained.

When the crosslinked polyphthalocyanine compound of the present invention is used in an amount of 0.01 to 5 parts by weight, based on 100 parts by weight of the ink composition, sufficient effects can be attained. Particularly, the ink composition of the present invention shows a strong infrared absorption spectrum at 750-900 nm. This spectral feature makes the ink composition suitable for use in documents for protection against using by stealth, copying, forging and counterfeiting. At this time, the ink composition can be applied to various inks, including general dye type inks for ink-jet printing, general pigment type inks for ink-jet printing, general inks for screen printing, and other inks.

Hereinafter, the present invention will be explained in more detail with reference to the following examples. However, these examples are provided to assist the understanding of the present invention and are not intended to limit the present invention.

EXAMPLES

Example 1

148 parts by weight of phthalic anhydride, 425 parts by weight of urea, 135 parts by weight of magnesium hexahydrate, 15 parts by weight of anhydrous magnesium chloride, 50 parts by weight of sodium chloride, 400 parts by weight of an alkyl benzene (LAB, ISU Chemical Co., Ltd., Korea) and 2 parts by weight of ammonium molybdate were mixed together, and then the mixture was sufficiently stirred. The mixture was heated to 235-250° C. over one hour. The mixture was allowed to react for 6 hours while supplying nitrogen gas at a flow rate of 350 ml/min. Thereafter, the reaction mixture was distilled to dryness under reduced pressure to evaporate the solvent, sequentially washed with 100 parts by weight of a 10% hydrochloric acid solution and 100 parts by weight of a 10% alkaline sodium hydroxide solution, and dried in a dryer at 80° C. until the weight was maintained constant. The dried material was dispersed in an aqueous ethylene glycol (5 wt %) solution until the concentration of the dispersion reached 10 wt %, heat-treated at 80° C. for one hour, filtered, washed with 500 ml of water at 100° C. three times, and dried at 80° C. for 24 hours. The dried material was added to 250 parts by weight of acetone, purified in a Soxhlet apparatus, and dried. The dried material was added to 250 parts by weight of dimethylacetamide, purified in a Soxhlet apparatus at 175° C., and dried to yield a product.

An infrared (IR) absorption spectrum and a $^{13}$C-NMR spectrum of the product are shown in FIGS. 1 and 2, respectively. The maximum absorbance of the product was measured using a UV-visible spectrophotometer, and is shown in Table 1. The results of elemental analysis of the product are shown in Table 2. These results reveal that the product is the crosslinked polyphthalocyanine compound represented by the following Formula 17:

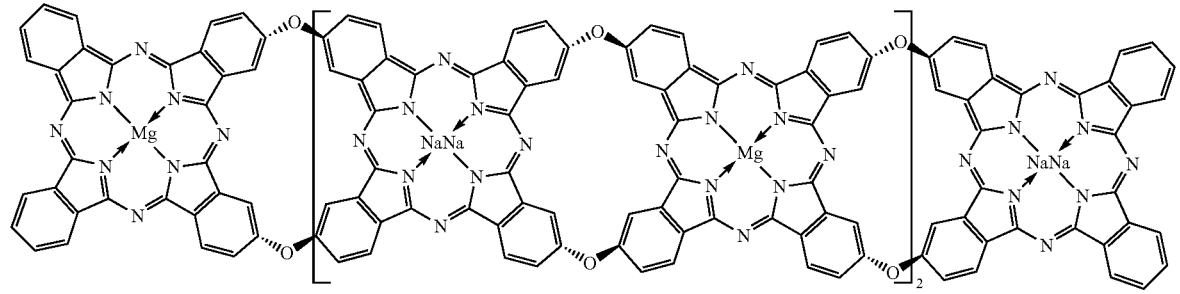

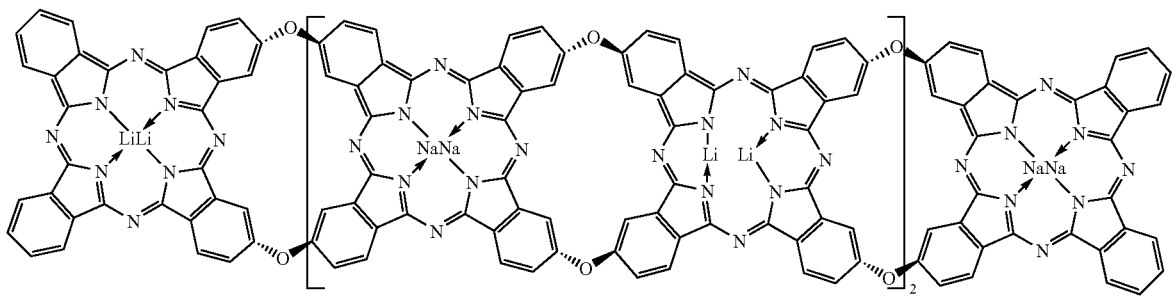

(18)

Example 2

Example 3

148 parts by weight of phthalic anhydride, 300 parts by weight of urea, 32 parts by weight of a lithium salt, 32 parts by weight of sodium chloride, 12 parts by weight of a lithium alcoholate, 1 part by weight of ammonium molybdate and 500 parts by weight of amyl alcohol were sufficiently mixed together. The mixture was heated to 220-230° C. over three hours. The mixture was allowed to react for 6 hours while supplying nitrogen gas at a flow rate of 300 ml/min. Thereafter, the reaction mixture was distilled to dryness under reduced pressure to evaporate the solvent, sequentially washed with 100 parts by weight of a 10% hydrochloric acid solution and 100 parts by weight of a 10% sodium hydroxide solution, and dried in a dryer at 80° C. until the weight was maintained constant. The dried material was dispersed in an aqueous ethylene glycol (5 wt %) solution until the concentration of the dispersion reached 10 wt %, heat-treated at 80° C. for one hour, filtered, washed with 500 ml of water at 100° C. three times, and dried at 80° C. for 24 hours. The dried material was added to 250 parts by weight of acetone, purified in a Soxhlet apparatus, and dried. The dried material was added to 250 parts by weight of dimethylacetamide, purified in a Soxhlet apparatus at 175° C., and dried to yield a product.

The infrared (IR) absorption spectrum and the $^{13}$C-NMR spectrum of the product were obtained. The maximum absorbance of the product was measured using a UV-visible spectrophotometer, and is shown in Table 1. The results of elemental analysis of the product are shown in Table 2. These results reveal that the product is the crosslinked polyphthalocyanine compound represented by the following Formula 18:

148 parts by weight of phthalic anhydride, 360 parts by weight of urea, 94.4 parts by weight of manganese chloride, 1 part by weight of ammonium molybdate, 1 part by weight of cobalt chloride and 500 parts by weight of an alkyl benzene (LAB, ISU Chemical Co., Ltd., Korea) were sufficiently mixed together. The mixture was heated to 220-230° C. over three hours. The mixture was allowed to react for 6 hours while supplying nitrogen gas at a flow rate of 300 ml/min. Thereafter, the reaction mixture was distilled to dryness under reduced pressure to evaporate the solvent, sequentially washed with 100 parts by weight of a 10% hydrochloric acid solution and 100 parts by weight of a 10% sodium hydroxide solution, and dried in a dryer at 80° C. until the weight was maintained constant. The dried material was dispersed in an aqueous ethylene glycol (5 wt %) solution until the concentration of the dispersion reached 10 wt %, heat-treated at 80° C. for one hour, filtered, washed with 500 ml of water at 100° C. three times, and dried at 80° C. for 24 hours. The dried material was added to 250 parts by weight of acetone, purified in a Soxhlet apparatus, and dried. The dried material was added to 250 parts by weight of dimethylacetamide, purified in a Soxhlet apparatus at 175° C., and dried to yield a product.

The infrared (IR) absorption spectrum and the $^{13}$C-NMR spectrum of the product were obtained. The maximum absorbance of the product was measured using a UV-visible spectrophotometer, and is shown in Table 1. The results of elemental analysis of the product are shown in Table 2. These results reveal that the product is the crosslinked polyphthalocyanine compound represented by the following Formula 19:

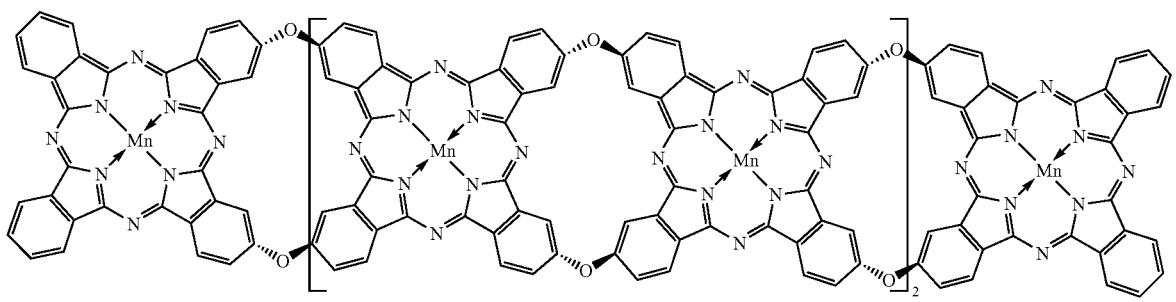

(19)

Example 4

148 parts by weight of phthalic anhydride, 360 parts by weight of urea, 141 parts by weight of potassium chloride, 32 parts by weight of silver chloride, 1 part by weight of ammonium molybdate and 500 parts by weight of an alkyl benzene (LAB, ISU Chemical Co., Ltd., Korea) were sufficiently mixed together. The mixture was heated to 220-230° C. over three hours. The mixture was allowed to react for 6 hours while supplying nitrogen gas at a flow rate of 300 ml/min. Thereafter, the reaction mixture was distilled to dryness under reduced pressure to evaporate the solvent, sequentially washed with 100 parts by weight of a 10% hydrochloric acid solution and 100 parts by weight of a 10% sodium hydroxide solution, and dried in a dryer at 80° C. until the weight was maintained constant. The dried material was dispersed in an aqueous ethylene glycol (5 wt %) solution until the concentration of the dispersion reached 10 wt %, heat-treated at 80° C. for one hour, filtered, washed with 500 ml of water at 100° C. three times, and dried at 80° C. for 24 hours. The dried material was added to 250 parts by weight of acetone, purified in a Soxhlet apparatus, and dried. The dried material was added to 250 parts by weight of dimethylacetamide, purified in a Soxhlet apparatus at 175° C., and dried to yield a product.

The infrared (IR) absorption spectrum and the $^{13}$C-NMR spectrum of the product were obtained. The maximum absorbance of the product was measured using a UV-visible spectrophotometer, and is shown in Table 1. The results of elemental analysis of the product are shown in Table 2. These results reveal that the product is the crosslinked polyphthalocyanine compound represented by the following Formula 21:

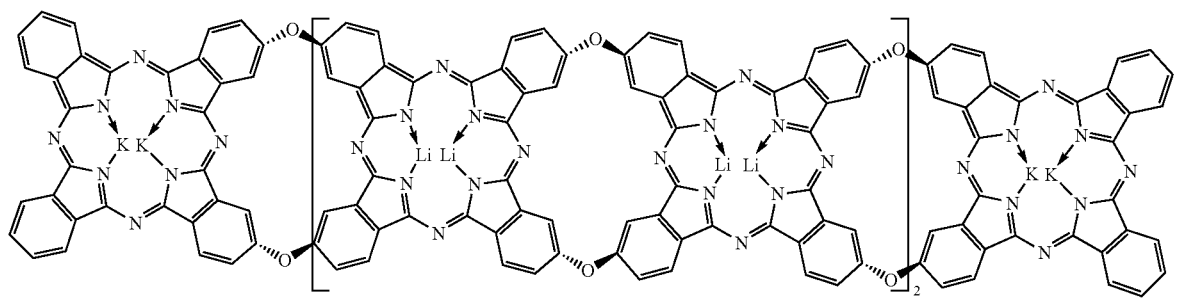

(21)

Example 5

148 parts by weight of phthalic anhydride, 360 parts by weight of urea, 56 parts by weight of potassium chloride, 16 parts by weight of lithium chloride, 1 part by weight of ammonium molybdate, 1 part by weight of cobalt chloride and 500 parts by weight of an alkyl benzene (LAB, ISU Chemical Co., Ltd., Korea) were sufficiently mixed together. The mixture was heated to 220-230° C. over three hours. The mixture was allowed to react for 6 hours while supplying nitrogen gas at a flow rate of 300 ml/min. Thereafter, the reaction mixture was distilled to dryness under reduced pressure to evaporate the solvent, sequentially washed with 100 parts by weight of a 10% hydrochloric acid solution and 100 parts by weight of a 10% sodium hydroxide solution, and dried in a dryer at 80° C. until the weight was maintained constant. The dried material was dispersed in an aqueous ethylene glycol (5 wt %) solution until the concentration of the dispersion reached 10 wt %, heat-treated at 80° C. for one hour, filtered, washed with 500 ml of water at 100° C. three times, and dried at 80° C. for 24 hours. The dried material was added to 250 parts by weight of acetone, purified in a Soxhlet apparatus, and dried. The dried material was added to 250 parts by weight of dimethylacetamide, purified in a Soxhlet apparatus at 175° C., and dried to yield a product.

The infrared (IR) absorption spectrum and the $^{13}$C-NMR spectrum of the product were obtained. The maximum absorbance of the product was measured using a UV-visible spectrophotometer, and is shown in Table 1. The results of elemental analysis of the product are shown in Table 2. These results reveal that the product is the crosslinked polyphthalocyanine compound represented by the following Formula 20:

Example 6

148 parts by weight of phthalic anhydride, 360 parts by weight of urea, 288 parts by weight of vanadium chloride, 1 part by weight of ammonium molybdate, 1 part by weight of cobalt chloride and 500 parts by weight of an alkyl benzene (LAB, ISU Chemical Co., Ltd., Korea) were sufficiently mixed together. The mixture was heated to 220-230° C. over three hours. The mixture was allowed to react for 6 hours while supplying nitrogen gas at a flow rate of 300 ml/min. Thereafter, the reaction mixture was distilled to dryness under reduced pressure to evaporate the solvent, sequentially washed with 100 parts by weight of a 10% hydrochloric acid solution and 100 parts by weight of a 10% sodium hydroxide solution, and dried in a dryer at 80° C. until the weight was maintained constant. The dried material was dispersed in an aqueous ethylene glycol (5 wt %) solution until the concentration of the dispersion reached 10 wt %, heat-treated at 80° C. for one hour, filtered, washed with 500 ml of water at 90-100° C. three times, and dried at 80° C. for 24 hours. The dried material was added to 250 parts by weight of acetone, purified in a Soxhlet apparatus, and dried. The dried material was added to 250 parts by weight of dimethylacetamide, purified in a Soxhlet apparatus at 175° C., and dried to yield a product.

The infrared (IR) absorption spectrum and the $^{13}$C-NMR spectrum of the product were obtained. The maximum absorbance of the product was measured using a UV-visible spectrophotometer, and is shown in Table 1. The results of elemental analysis of the product are shown in Table 2. These results reveal that the product is the crosslinked polyphthalocyanine compound represented by the following Formula 22:

(22)

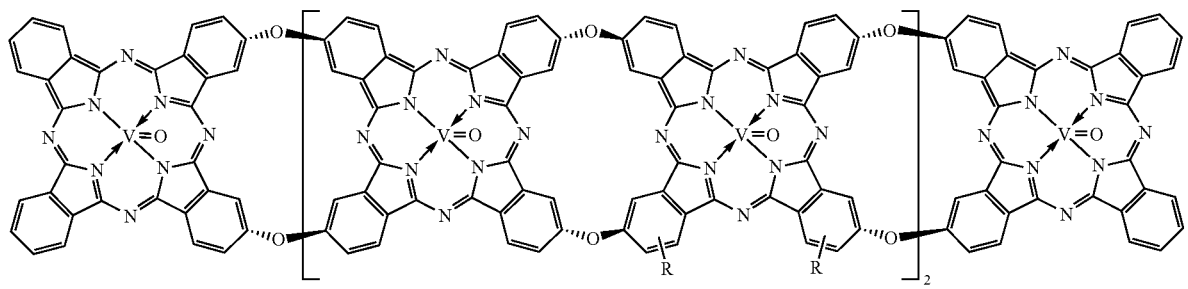

Comparative Example 1

An infrared (IR) absorption spectrum and a $^{13}$C-NMR spectrum of the magnesium phthalocyanine compound of Formula 23 are shown in FIGS. 3 and 4, respectively. The maximum absorbance of the compound was measured using a UV-visible spectrophotometer, and is shown in Table 1.

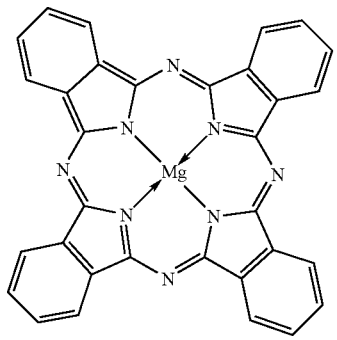

(23)

TABLE 1

| Example No. | $M_1, M_2$ | Maximum absorbance |
|---|---|---|
| Example 1 | Mg, Na | 840 |
| Example 2 | Li, Na | 840 |
| Example 3 | Mn, Mn | 840 |
| Example 4 | K, Ag | 840 |
| Example 5 | K, Li | 890 |
| Example 6 | VO, VO | 890 |
| Comparative Example 1 | Mg | 668 |

TABLE 2

| Example No. | Molecular weight | N | C | H | O | Metal(s) |
|---|---|---|---|---|---|---|
| Example 1 | 3425.8 | 19.6 | 67.3 | 2.2 | 4.7 | 6.2 |
| Example 2 | 3394.6 | 19.8 | 67.9 | 2.3 | 4.7 | 5.3 |
| Example 3 | 3544.6 | 19.0 | 65.1 | 2.2 | 4.5 | 9.2 |
| Example 4 | 3773.2 | 17.8 | 61.1 | 2.0 | 4.2 | 14.9 |
| Example 5 | 3491.2 | 19.3 | 66.0 | 2.2 | 4.6 | 7.9 |
| Example 6 | 3616.6 | 18.6 | 63.8 | 2.1 | 7.1 | 8.4 |

From the data shown in Tables 1 and 2, the structures of the crosslinked polyphthalocyanine compounds prepared in Examples 1 to 6 of the present invention could be identified. As can be seen from the results of Table 1, the crosslinked polyphthalocyanine compounds of the present invention had a maximum absorption wavelength of 840 nm or 890 nm and could strongly absorb near-infrared wavelengths when compared to the conventional single molecular magnesium phthalocyanine compound of Comparative Example 1. In contrast, the magnesium phthalocyanine compound of Comparative Example 1 had a low absorptivity in the near-infrared region. In addition, the maximum absorption wavelength (670 nm) of the magnesium phthalocyanine compound of Comparative Example 1 was close to the visible region.

The spectra of FIGS. 1 to 4 indicate a distinct difference in the structure between the crosslinked polyphthalocyanine compound prepared in Example 1 and the magnesium phthalocyanine compound of Comparative Example 1.

Examples 7 to 12

Dye type ink compositions for ink-jet printing were prepared as indicated in Table 3. Specifically, each of the ink compositions was prepared in accordance with the following procedure. First, a near-infrared absorber was mixed with a small amount of a surfactant in an appropriate amount of distilled water, and dispersed using a three-roll mill. The remaining amount of the distilled water, a dye for ink-jet printing, a solvent, an antibacterial agent, a viscosity modifier, and the remaining amount of the surfactant were added to the dispersion, followed by mixing. The mixture was passed through a filter paper (0.45 micron) to prepare an ink. As the dye, a black dye (direct black, CI.No 19) was used. N-methyl pyrrolidone was used as the solvent. Tween 80 (Uniqema, U.S.A.) was used as the surfactant. Bactocide 4000 (Asung Fine Chemical, Korea) was used as the antibacterial agent. Ethylene glycol was used as the viscosity modifier. The compound prepared in Example 1 was used as the near-infrared absorber.

Ink-jet printing was conducted using the inks. The printed inks were tested for near-infrared absorptivity at 890 nm using a near-infrared absorption spectrometer (Shimadzu/UV3101 PC). The transmittance of the inks is shown in Table 3.

TABLE 3

| Example No. | Dye (g) | Solvent (g) | Surfactant (g) | Antibacterial Agent (g) | Viscosity Modifier (g) | Near-infrared Absorber (g) | Distilled water (g) | Transmittance (%) |
|---|---|---|---|---|---|---|---|---|
| Example 7 | 6 | 10 | 3 | 1 | 1 | 0.005 | 78.995 | 20 |
| Example 8 | 6 | 10 | 3 | 1 | 1 | 0.01 | 78.99 | 10 |
| Example 9 | 6 | 10 | 3 | 1 | 1 | 0.1 | 78.9 | 6 |
| Example 10 | 6 | 10 | 3 | 1 | 1 | 0.5 | 78.5 | 4 |
| Example 11 | 6 | 10 | 3 | 1 | 1 | 2 | 77 | 3 |
| Example 12 | 6 | 10 | 3 | 1 | 1 | 5 | 74 | 2 |

As is evident from the data shown in Table 3, the dye type inks for ink-jet printing prepared in Examples 8 to 12, in which the near-infrared absorber was added within the preferred range, showed a transmittance of 10% or less, indicating good near-infrared absorptivity.

Examples 13 to 18

Pigment type ink compositions for ink-jet printing were prepared as indicated in Table 4. Specifically, each of the ink compositions was prepared in accordance with the following procedure. First, a near-infrared absorber was mixed with a small amount of a surfactant in an appropriate amount of distilled water, and dispersed using a three-roll mill. The remaining amount of the distilled water, a pigment, a solvent, an antibacterial agent, a viscosity modifier, and the remaining amount of the surfactant were added to the dispersion, followed by mixing. The mixture was passed through a filter paper (0.45 micron) to prepare an ink. As the pigment, a red pigment (CI.No 219) was used. Methyl ethyl ketone was used as the solvent. JONCRYL 678 (Johnson Polymer Corp.) was used as the surfactant. Bactocide 4000 (Asung Fine Chemical, Korea) was used as the antibacterial agent. Ethylene glycol was used as the viscosity modifier. The compound prepared in Example 1 was used as the near-infrared absorber.

Ink-jet printing was conducted using the inks. The printed inks were tested for near-infrared absorptivity at 890 nm using a near-infrared absorption spectrometer (Shimadzu/UV3101 PC). The transmittance of the inks is shown in Table 4.

As is evident from the data shown in Table 4, the pigment type inks for ink-jet printing prepared in Examples 14 to 18, in which the near-infrared absorber was added within the preferred range, showed a transmittance of 10% or less, indicating good near-infrared absorptivity.

Examples 19 to 24

Ink compositions for screen printing were prepared as indicated in Table 5. Specifically, each of the ink compositions was prepared by mixing distilled water, a pigment, a resin, a penetrant, a stabilizer, an additive, a surfactant, an antibacterial agent, a near-infrared absorber and a solvent, and dispersing the mixture using a three-roll mill. As the pigment, a black pigment (CI.No 51) was used. An alkyd varnish resin was used as the resin. Wax was used as the penetrant. Wax was used as the stabilizer. Talc was used as the additive. BYK 410 (BYK Chemie) was used as the surfactant. Bactocide 4000 (Asung Fine Chemical, Korea) was used as the antibacterial agent. The compound prepared in Example 1 was used as the near-infrared absorber. Cyclohexane was used as the solvent.

Ink-jet printing was conducted using the inks. The printed inks were tested for near-infrared absorptivity at 890 nm using a near-infrared absorption spectrometer (Shimadzu/UV3101 PC). The transmittance of the inks is shown in Table 5.

TABLE 4

| Example No. | Pigment (g) | Solvent (g) | Surfactant (g) | Antibacterial agent (g) | Viscosity Modifier (g) | Near-Infrared absorber (g) | Distilled water (g) | Transmittance (%) |
|---|---|---|---|---|---|---|---|---|
| Example 13 | 6 | 10 | 3 | 1 | 1 | 0.005 | 78.995 | 25 |
| Example 14 | 6 | 10 | 3 | 1 | 1 | 0.01 | 78.99 | 10 |
| Example 15 | 6 | 10 | 3 | 1 | 1 | 0.1 | 78.9 | 5 |
| Example 16 | 6 | 10 | 3 | 1 | 1 | 0.5 | 78.5 | 4 |
| Example 17 | 6 | 10 | 3 | 1 | 1 | 2 | 77 | 3 |
| Example 18 | 6 | 10 | 3 | 1 | 1 | 5 | 74 | 2 |

TABLE 5

| Example No. | Pigment (g) | Resin (g) | Penetrant (g) | Stabilizer (g) | Additive (g) | Surfactant (g) | Antibacterial agent (g) | Near-infrared absorber (g) | Solvent (g) | Transmittance (%) |
|---|---|---|---|---|---|---|---|---|---|---|
| Ex. 19 | 5 | 35 | 5 | 9 | 25 | 3 | 1 | 0.005 | 16.995 | 25 |
| Ex. 20 | 5 | 35 | 5 | 9 | 25 | 3 | 1 | 0.01 | 16.99 | 10 |

TABLE 5-continued

| Example No. | Pigment (g) | Resin (g) | Penetrant (g) | Stabilizer (g) | Additive (g) | Surfactant (g) | Anti-bacterial agent (g) | Near-infrared absorber (g) | Solvent (g) | Transmittance (%) |
|---|---|---|---|---|---|---|---|---|---|---|
| Ex. 21 | 5 | 35 | 5 | 9 | 25 | 3 | 1 | 0.1 | 16.9 | 5 |
| Ex. 22 | 5 | 35 | 5 | 9 | 25 | 3 | 1 | 0.5 | 16.5 | 4 |
| Ex. 23 | 5 | 35 | 5 | 9 | 25 | 3 | 1 | 2 | 15 | 3 |
| Ex. 24 | 5 | 35 | 5 | 9 | 25 | 3 | 1 | 5 | 12 | 2 |

As is evident from the data shown in Table 4, the inks for screen printing prepared in Examples 20 to 24, in which the near-infrared absorber was added within the preferred range, showed a transmittance of 10% or less, indicating good near-infrared absorptivity.

INDUSTRIAL APPLICABILITY

As apparent from the above description, since the novel crosslinked polyphthalocyanine compound of the present invention has a high absorptivity in the near-infrared wavelength region, it is suitable for use as a near-infrared absorber.

In addition, although a small amount of the crosslinked polyphthalocyanine compound, which has a high absorptivity in the near-infrared wavelength region, is added as a near-infrared absorber to prepare an ink, the desired effects can be attained.

What is claimed is:

1. A crosslinked polyphthalocyanine compound represented by Formula 3 below:

(3)

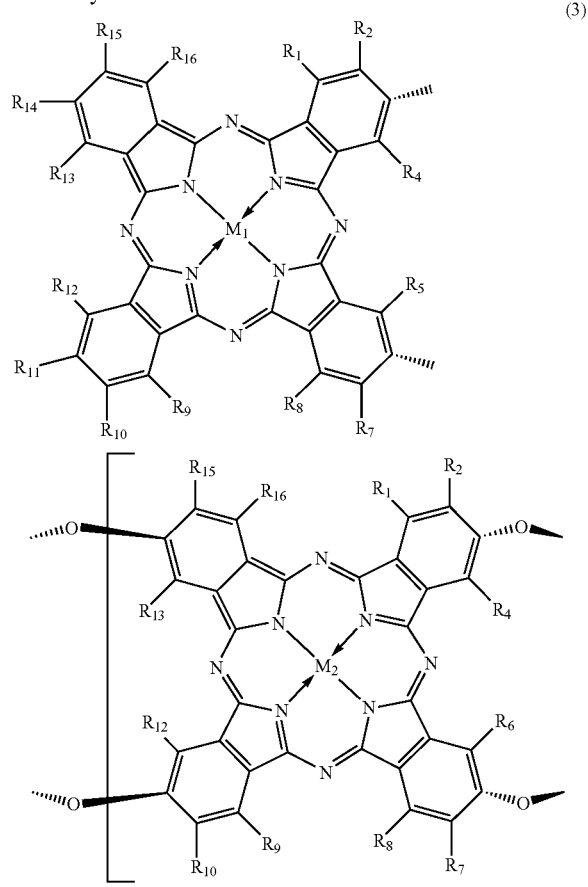

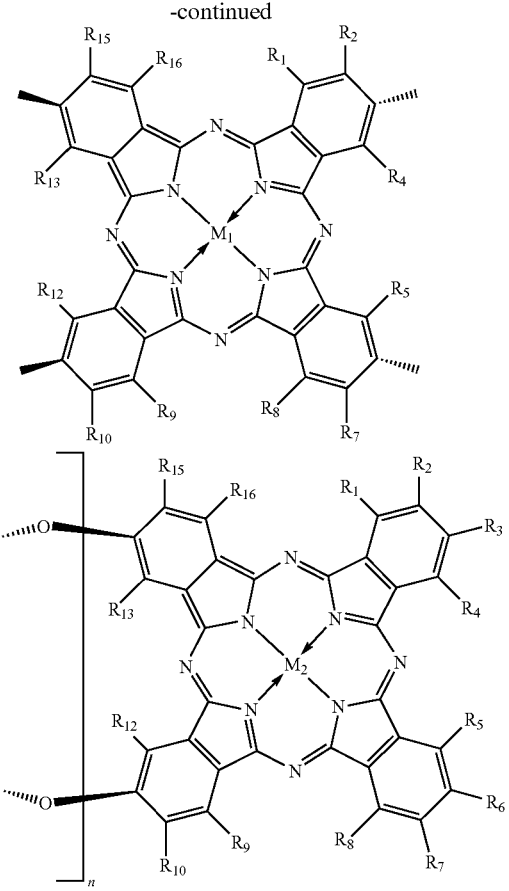

wherein $M_1$ and $M_2$, which are the same or different from each other, are independently selected from the group consisting of nonmetals, metals, metal oxides, and metal halides; $R_1$ to $R_{16}$, which are the same or different from each other, are independently selected from the group consisting of a hydrogen atom, a halogen atom, a hydroxyl group, an amino group, a hydroxysulfonyl group, an aminosulfonyl group, alkyl groups, substituted $C_1$-$C_{20}$ alkyl groups, $SR_{17}$ in which $R_{17}$ is a substituted phenyl group or an alkyl group, $SR_{18}$ in which $R_{18}$ is a phenyl group substituted with a $C_1$-$C_{20}$ alkoxy group, $OR_{19}$ in which $R_{19}$ is a substituted phenyl group or an arylalkyl group, $NHR_{20}$ in which $R_{20}$ is a substituted phenyl group or an arylalkyl group, and $NHR_{21}$ in which $R_{21}$ is a substituted $C_1$-$C_{20}$ alkyl group and n is an integer from 1 to 20.

2. The polyphthalocyanine compound according to claim 1, wherein one of $R_1$ to $R_4$ is R, one of $R_5$ to $R_8$ is R, one of $R_9$ to $R_{12}$ is R, one of $R_{13}$ to $R_{16}$ is R and the others are hydrogen in Formula 3, represented by Formula 4 below:

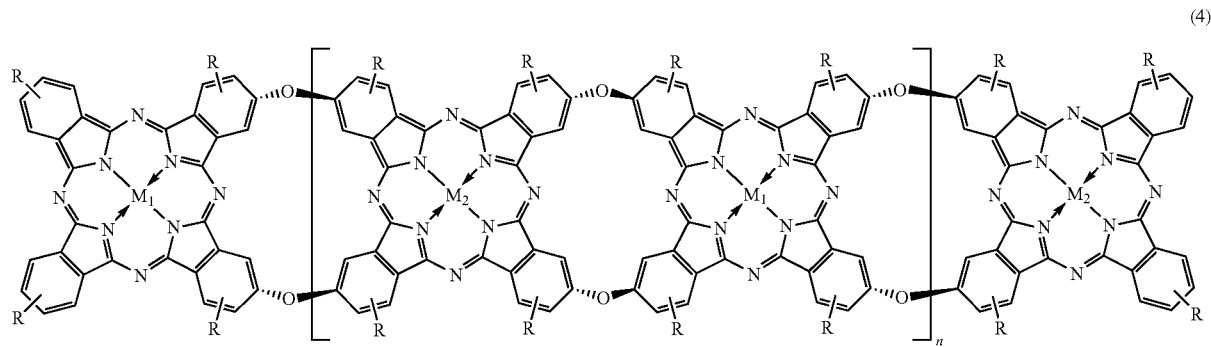

(4)

wherein $M_1$ and $M_2$, which are the same or different from each other, are independently selected from the group consisting of nonmetals, metals, metal oxides, and metal halides; each R is hydrogen or a $C_4$-$C_8$ alkyl group; and n is an integer from 2 to 4.

3. The polyphthalocyanine compound according to claim 2, wherein each $M_1$ and $M_2$ is manganese in Formula 4, represented by Formula 5 below:

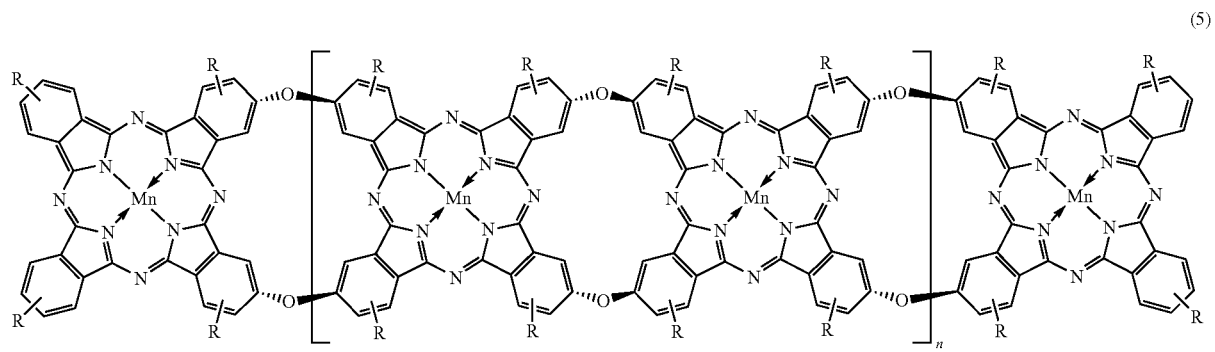

(5)

wherein each R is a $C_4$-$C_8$ alkyl group and n is an integer from 2 to 4.

4. The polyphthalocyanine compound according to claim 2, wherein each $M_1$ and $M_2$ is vanadyl in Formula 4, represented by Formula 6 below:

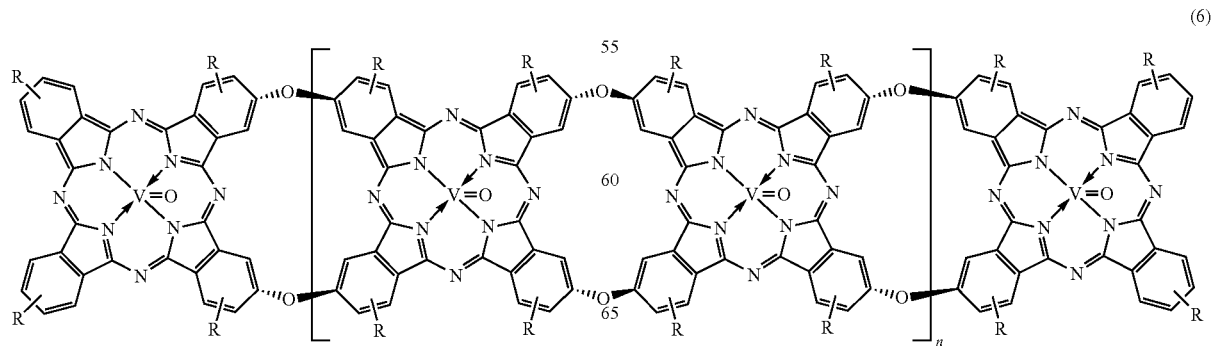

(6)

wherein each R is a $C_4$-$C_8$ alkyl group and n is an integer from 2 to 4.

5. The polyphthalocyanine compound according to claim 2, wherein $M_1$ and $M_2$ are different from each other in Formula 4.

6. The polyphthalocyanine compound according to claim 5, wherein $M_1$ is magnesium and $M_2$ is sodium, represented by Formula 7 below:

(7)

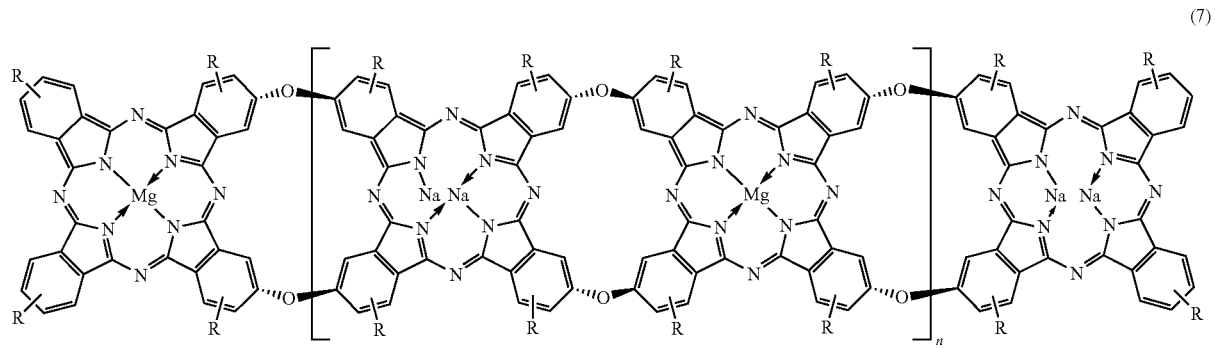

wherein each R is a $C_4$-$C_8$ alkyl group and n is an integer from 2 to 4.

7. The polyphthalocyanine compound according to claim 5, wherein $M_1$ is lithium and $M_2$ is sodium, represented by Formula 8 below:

(8)

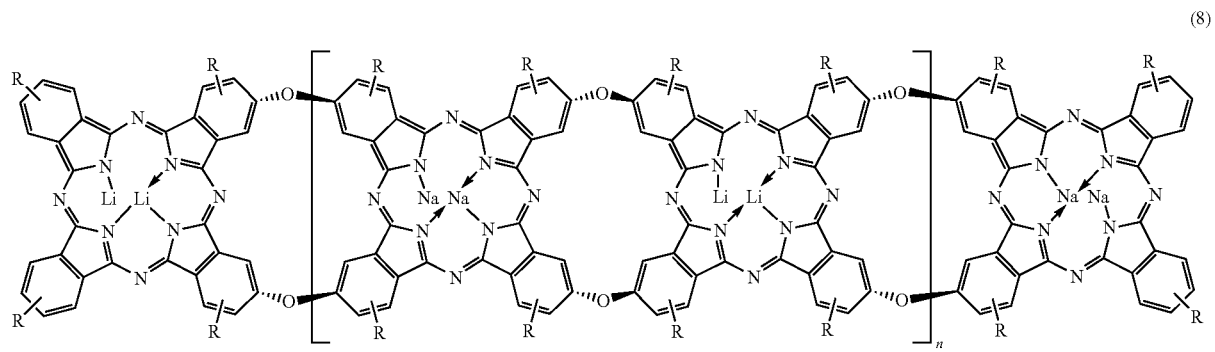

wherein each R is a $C_4$-$C_8$ alkyl group and n is an integer from 2 to 4.

8. The polyphthalocyanine compound according to claim 5, wherein $M_1$ is potassium and $M_2$ is silver, represented by Formula 9 below:

(9)

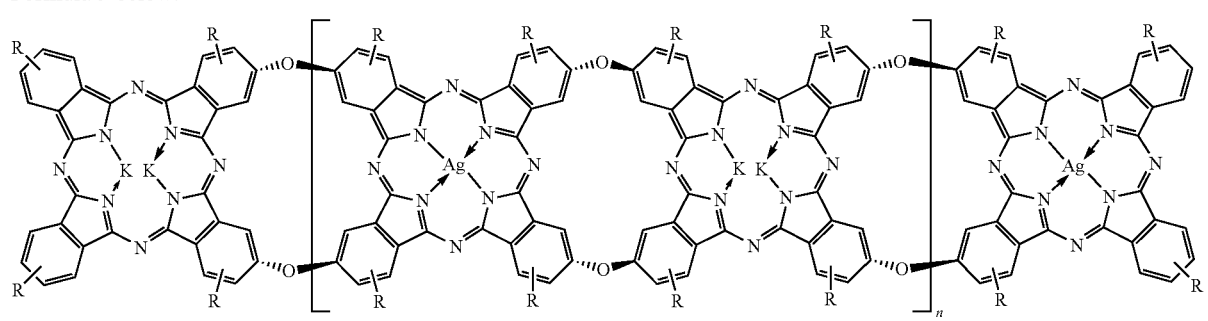

wherein each R is a $C_4$-$C_8$ alkyl group and n is an integer from 2 to 4.

9. The polyphthalocyanine compound according to claim 2, wherein each R is hydrogen in Formula 4, represented by Formula 10 below:

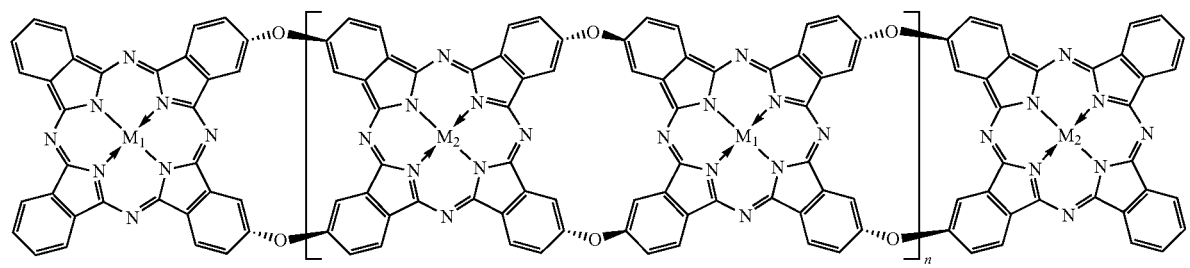

(10)

wherein $M_1$ and $M_2$, which is the same or different from each other, are independently selected from the group consisting of nonmetals, metals, metal oxides, and metal halides; and n is an integer from 2 to 4.

10. The polyphthalocyanine compound according to claim 9, wherein each $M_1$ and $M_2$ is manganese in Formula 10, represented by Formula 11 below:

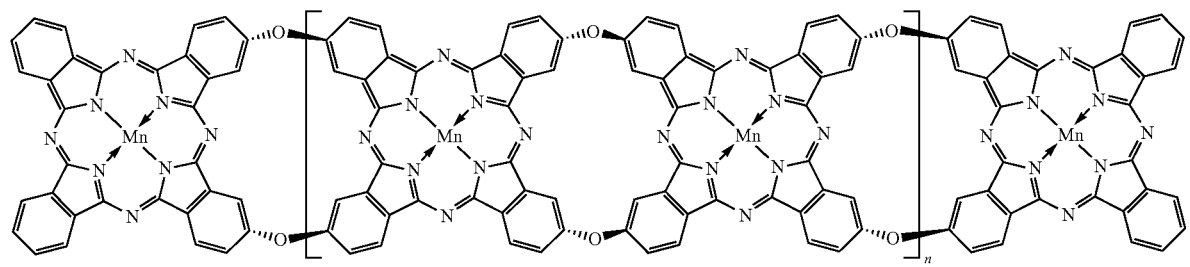

(11)

wherein n is an integer from 2 to 4.

11. The polyphthalocyanine compound according to claim 9, wherein each $M_1$ and $M_2$ is vanadyl in Formula 10, represented by Formula 12 below:

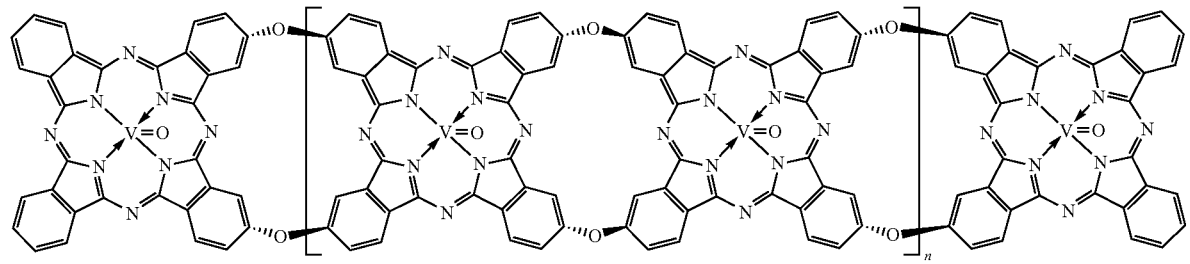

(12)

wherein n is an integer from 2 to 4.

12. The polyphthalocyanine compound according to claim 9, wherein $M_1$ and $M_2$ are different from each other in Formula 10.

13. The polyphthalocyanine compound according to claim 12, wherein $M_1$ is magnesium and $M_2$ is sodium, represented by Formula 13 below:

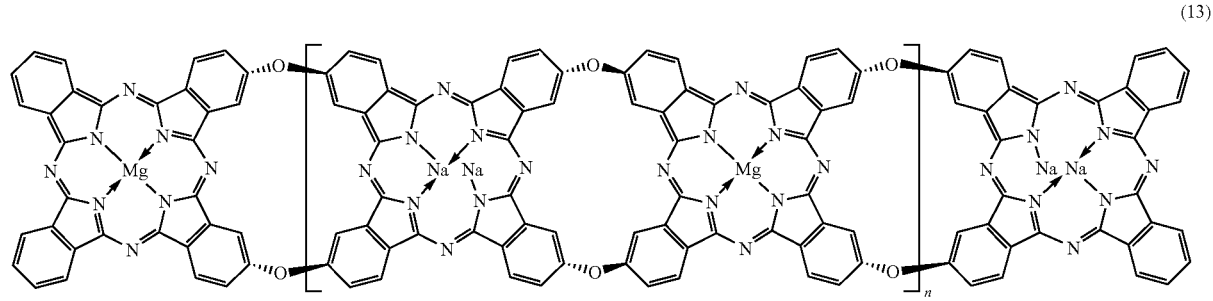

(13)

wherein n is an integer from 2 to 4.

14. The polyphthalocyanine compound according to claim 12, wherein $M_1$ is lithium and $M_2$ is sodium, represented by Formula 14 below:

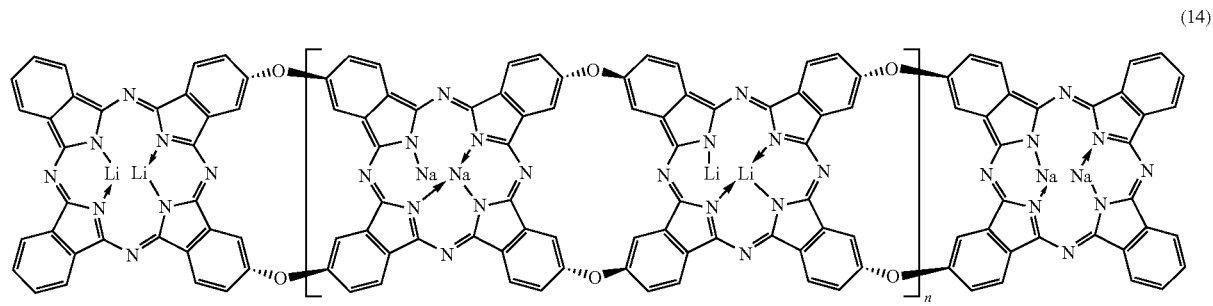

(14)

wherein n is an integer from 2 to 4.

15. The polyphthalocyanine compound according to claim 12, wherein $M_1$ is potassium and $M_2$ is silver, represented by Formula 15 below:

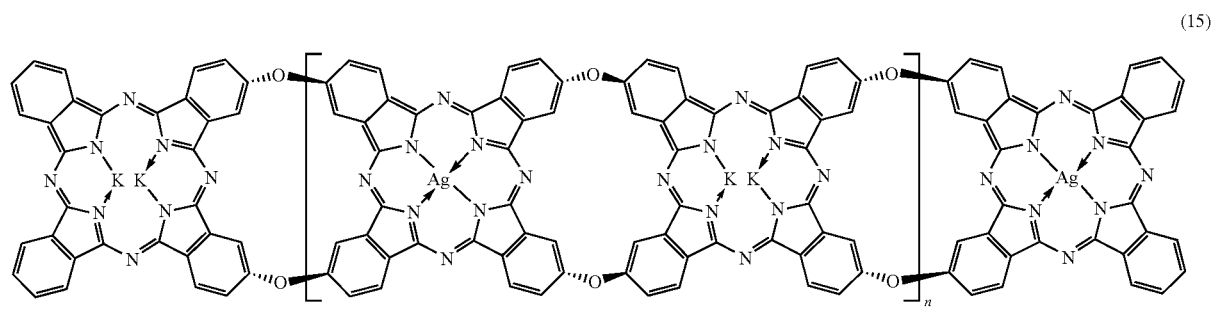

(15)

wherein n is an integer from 2 to 4.

16. A near-infrared absorbing ink composition comprising, as a near-infrared absorber, a compound of Formula 3 below:

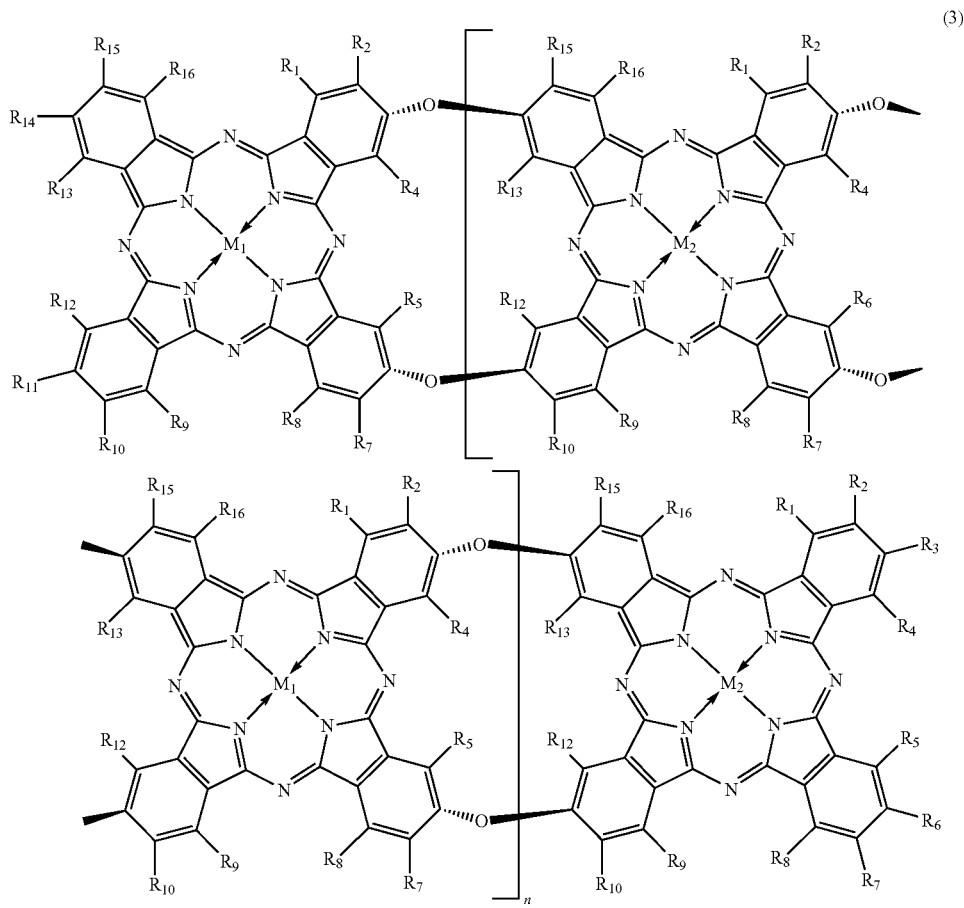

(3)

wherein $M_1$ and $M_2$, which are the same or different from each other, are independently selected from the group consisting of nonmetals, metals, metal oxides, and metal halides; $R_1$ to $R_{16}$, which are the same or different from each other, are independently selected from the group consisting of a hydrogen atom, a halogen atom, a hydroxyl group, an amino group, a hydroxysulfonyl group, an aminosulfonyl group, alkyl groups, substituted $C_1$-$C_{20}$ alkyl groups, $SR_{17}$ in which $R_{17}$ is a substituted phenyl group or an alkyl group, $SR_{18}$ in which $R_{18}$ is a phenyl group substituted with a $C_1$-$C_{20}$ alkoxy group, $OR_{19}$ in which $R_{19}$ is a substituted phenyl group or an arylalkyl group, $NHR_{20}$ in which $R_{20}$ is a substituted phenyl group or an arylalkyl group, and $NHR_{21}$ in which $R_{21}$ is a substituted $C_1$-$C_{20}$ alkyl group; and n is an integer from 1 to 20.

17. The ink composition according to claim 16, wherein the crosslinked polyphthalocyanine compound is present in an amount of 0.01 to 5 parts by weight, based on 100 parts by weight of the ink composition.

18. The ink composition according to claim 16 or 17, wherein the ink composition is a dye ink for ink-jet printing.

19. The ink composition according to claim 16 or 17, wherein the ink composition is a pigment ink for ink-jet printing.

20. The ink composition according to claim 16 or 17, wherein the ink composition is an ink for screen printing.

* * * * *